(12) United States Patent
Anderson et al.

(10) Patent No.: US 7,651,146 B2
(45) Date of Patent: Jan. 26, 2010

(54) VEHICLE CARGO SIDEWALL STRUCTURE

(75) Inventors: Erik Anderson, Plymouth, MI (US);
Richard Miller, Brentwood, TN (US);
Robert Blanchard, Fenton, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 16 days.

(21) Appl. No.: 12/019,550

(22) Filed: Jan. 24, 2008

(65) Prior Publication Data
US 2009/0189404 A1    Jul. 30, 2009

(51) Int. Cl.
*B60R 9/00* (2006.01)
(52) U.S. Cl. .................................... 296/37.6
(58) Field of Classification Search ............. 296/37.1, 296/37.8, 37.6, 37.13, 37.16
See application file for complete search history.

(56) References Cited

U.S. PATENT DOCUMENTS

| | | | | |
|---|---|---|---|---|
| 3,712,744 | A | * | 1/1973 | Nelson .................. 356/238.1 |
| 4,135,761 | A | * | 1/1979 | Ward ..................... 296/37.6 |
| 4,660,880 | A | * | 4/1987 | Bensch .................. 296/37.1 |
| 4,917,430 | A | | 4/1990 | Lawrence |
| 5,567,000 | A | | 10/1996 | Clare |
| 5,615,922 | A | | 4/1997 | Blanchard |
| 5,823,598 | A | | 10/1998 | Clare et al. |
| 6,012,754 | A | | 1/2000 | Clare et al. |
| 6,059,341 | A | | 5/2000 | Jensen et al. |
| 6,129,401 | A | * | 10/2000 | Neag et al. .............. 296/37.6 |
| 6,155,625 | A | | 12/2000 | Felix |
| 6,254,162 | B1 | | 7/2001 | Faber et al. |
| 6,439,634 | B1 | | 8/2002 | Jensen et al. |
| 6,464,276 | B1 | * | 10/2002 | Gruich ................... 296/37.6 |
| 6,474,715 | B2 | | 11/2002 | Fukushima et al. |
| 6,485,077 | B1 | | 11/2002 | Foster et al. |
| 6,499,795 | B2 | | 12/2002 | Clare |
| 6,880,875 | B2 | | 4/2005 | McClure et al. |
| 6,966,593 | B2 | | 11/2005 | Plentis et al. |

(Continued)

FOREIGN PATENT DOCUMENTS

EP    1547870 B1    8/2007

(Continued)

OTHER PUBLICATIONS

Picture of Ford Sport Trac.

(Continued)

*Primary Examiner*—Dennis H Pedder
(74) *Attorney, Agent, or Firm*—Global IP Counselors, LLP

(57) ABSTRACT

A vehicle cargo sidewall structure includes a vertical inboard wall panel, a vertical outboard wall panel, door panel and a storage bin. The inboard wall panel includes an access opening. The outboard wall panel extends along side the inboard wall panel to define a side wall structure with a concealed storage space located between the inboard and outboard wall panels. The storage space is accessible via the access opening. The door panel moves between a closed position overlaying the access opening concealing the storage space and an opened position exposing the storage space. The storage bin is coupled to the door panel for movement therewith such that with the door panel in the closed position the storage bin is disposed within the storage space and with the door panel in the opened position the storage bin at least partially extends out of the storage space.

29 Claims, 21 Drawing Sheets

U.S. PATENT DOCUMENTS

| | | |
|---|---|---|
| 7,086,689 B2 | 8/2006 | Dean |
| 7,219,941 B1 | 5/2007 | San Paolo et al. |
| 2001/0013709 A1* | 8/2001 | Clare et al. ................ 296/37.6 |
| 2005/0052045 A1 | 3/2005 | Juzwiak |
| 2005/0134070 A1 | 6/2005 | Plentis et al. |
| 2006/0219746 A1 | 10/2006 | Kniffel et al. |

FOREIGN PATENT DOCUMENTS

| | | | |
|---|---|---|---|
| WO | WO-03-024743 | A2 | 3/2003 |
| WO | WO-03-024743 | A3 | 10/2003 |

OTHER PUBLICATIONS

Picture of Nissan Titan.
Picture of Dodge Ram.
Picture of Dodge Ram2.
Picture of Toyota Tacoma.
Picture of Chevy Avalance.
Picture of Aftermarket Type.

* cited by examiner

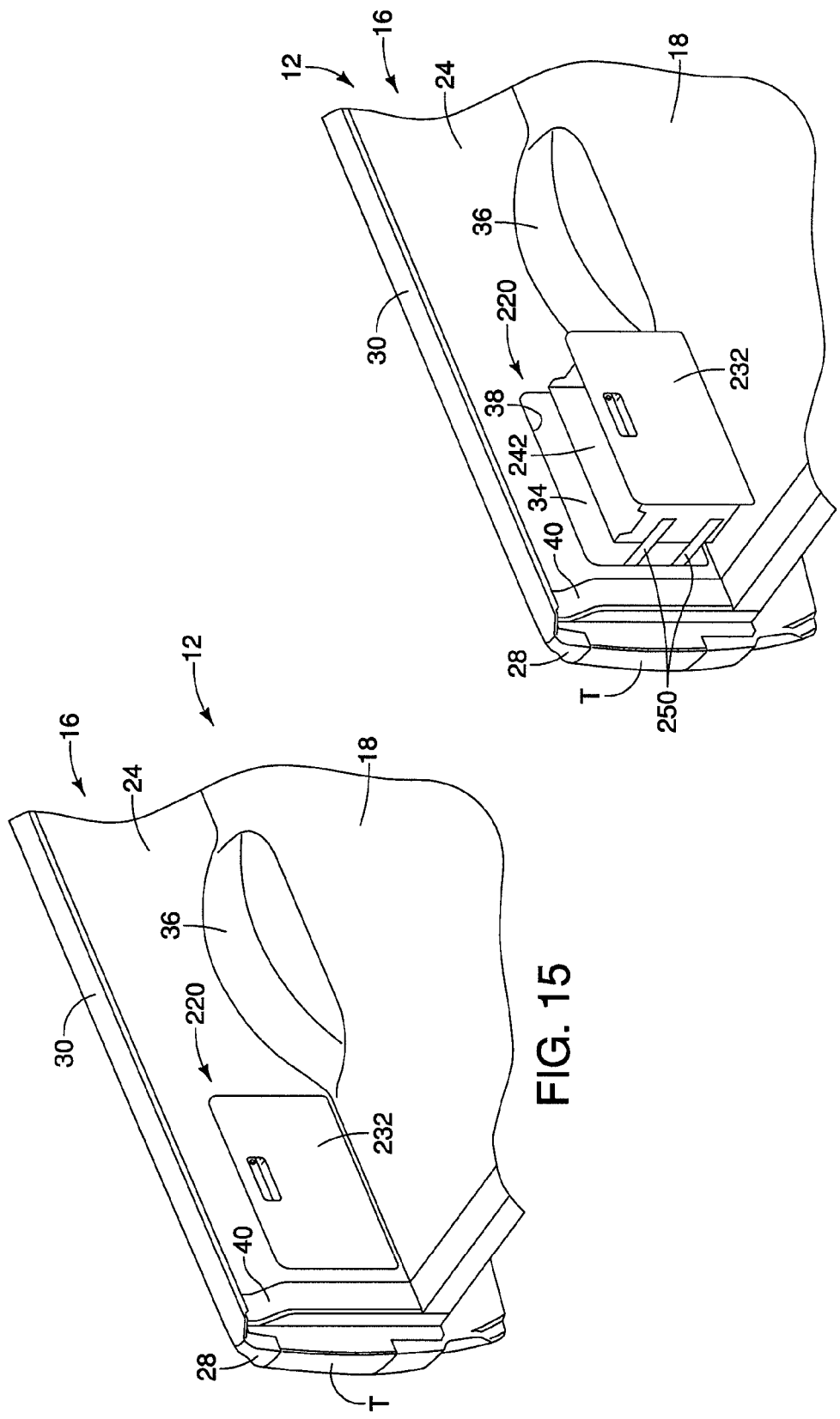

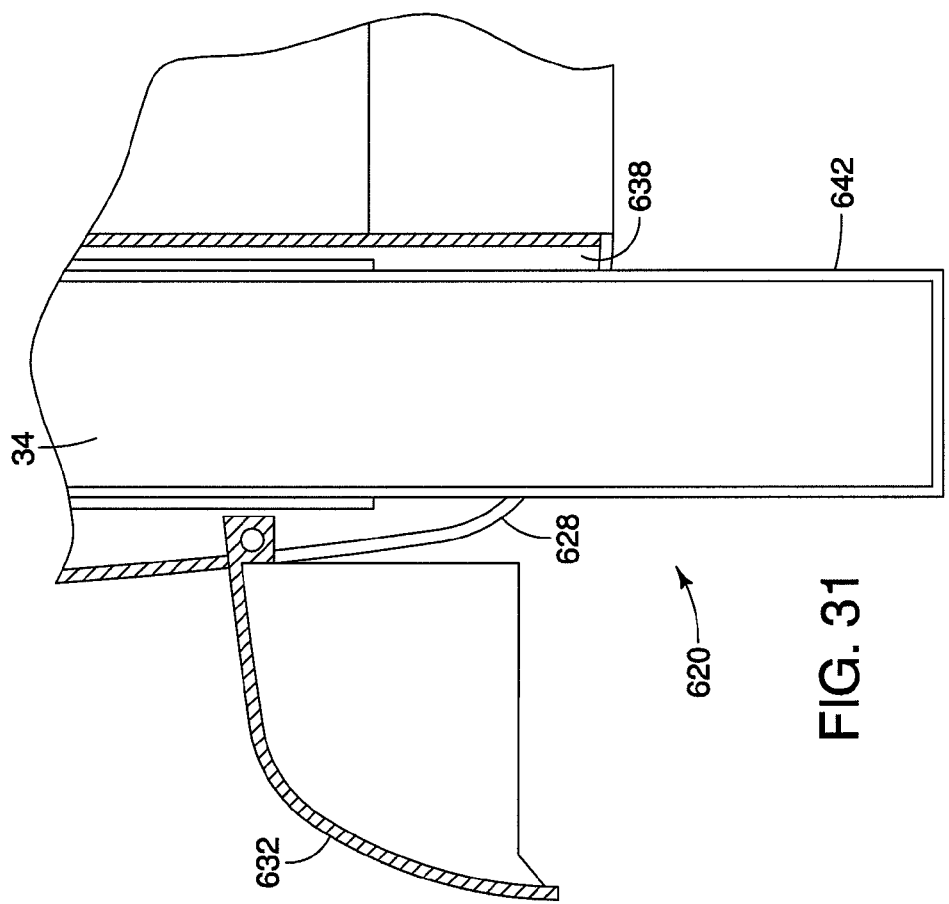
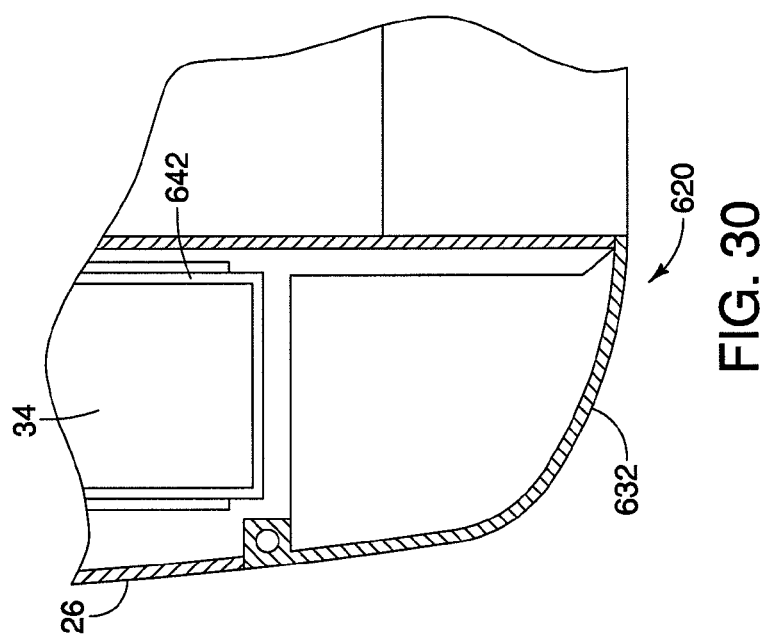

VEHICLE CARGO SIDEWALL STRUCTURE

BACKGROUND OF THE INVENTION

1. Field of the Invention

The present invention relates to a vehicle cargo sidewall structure. More specifically, the present invention relates to a sidewall structure of a pickup truck with a concealed storage compartment within the side wall structure.

2. Background Information

For many years, vehicles such as pickup trucks have been provided with add-on tool boxes or storage boxes that are installed in the cargo bed area of the pickup truck. Such storage boxes typically include locking latches and therefore provide some security for expensive tools and/or equipment stored within such storage boxes. However, a problem with such add-on storage boxes is that they reduce the overall capacity of the cargo bed area of the pickup truck.

In view of the above, it will be apparent to those skilled in the art from this disclosure that there exists a need for an improved storage box or storage compartment in the cargo bed area of a pickup truck that does not reduce the overall capacity of the cargo bed area. This invention addresses this need in the art as well as other needs, which will become apparent to those skilled in the art from this disclosure.

SUMMARY OF THE INVENTION

One object of the invention is to utilize the hollow space within a vehicle cargo sidewall structure as a storage compartment.

In accordance with one aspect of the invention, a vehicle cargo sidewall structure includes a vertical inboard wall panel that at least partially defines a cargo area of a vehicle. The inboard wall panel has an access opening. A vertical outboard wall panel extends along side the inboard wall panel to define a side wall structure with a concealed storage space located between opposed portions of the inboard and outboard wall panels. The storage space is accessible via the access opening. A door panel is movably arranged between a closed position overlaying the access opening to conceal the storage space and an opened position to expose the storage space. A storage bin is coupled to the door panel for movement therewith such that with the door panel in the closed position the storage bin is disposed within the storage space and with the door panel in the opened position the storage bin at least partially extends out of the storage space.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 15 is a fragmentary perspective view of the sidewall structure of the cargo area showing a door panel of a storage compartment in a closed position concealing the storage space in accordance with a third embodiment of the present invention;

FIG. 16 is another fragmentary perspective view of the sidewall structure of the cargo area similar to FIG. 15 showing the door panel in an opened position revealing the storage space and a storage bin in accordance with the third embodiment of the present invention;

FIG. 30 is a top cross-sectional view of the sidewall structure of the cargo area showing details of the sidewall structure with the part door panel in the closed position with the sliding drawer-type storage bin concealed within the storage space of the sidewall structure in accordance with the seventh embodiment of the present invention; and FIG. 31 is another top cross-sectional view of the sidewall structure of the cargo area similar to FIG. 30, showing details of the sidewall structure with the door panel in the opened position and the sliding drawer-type storage bin at least partially extending out of the storage space of the sidewall structure in accordance with the seventh embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
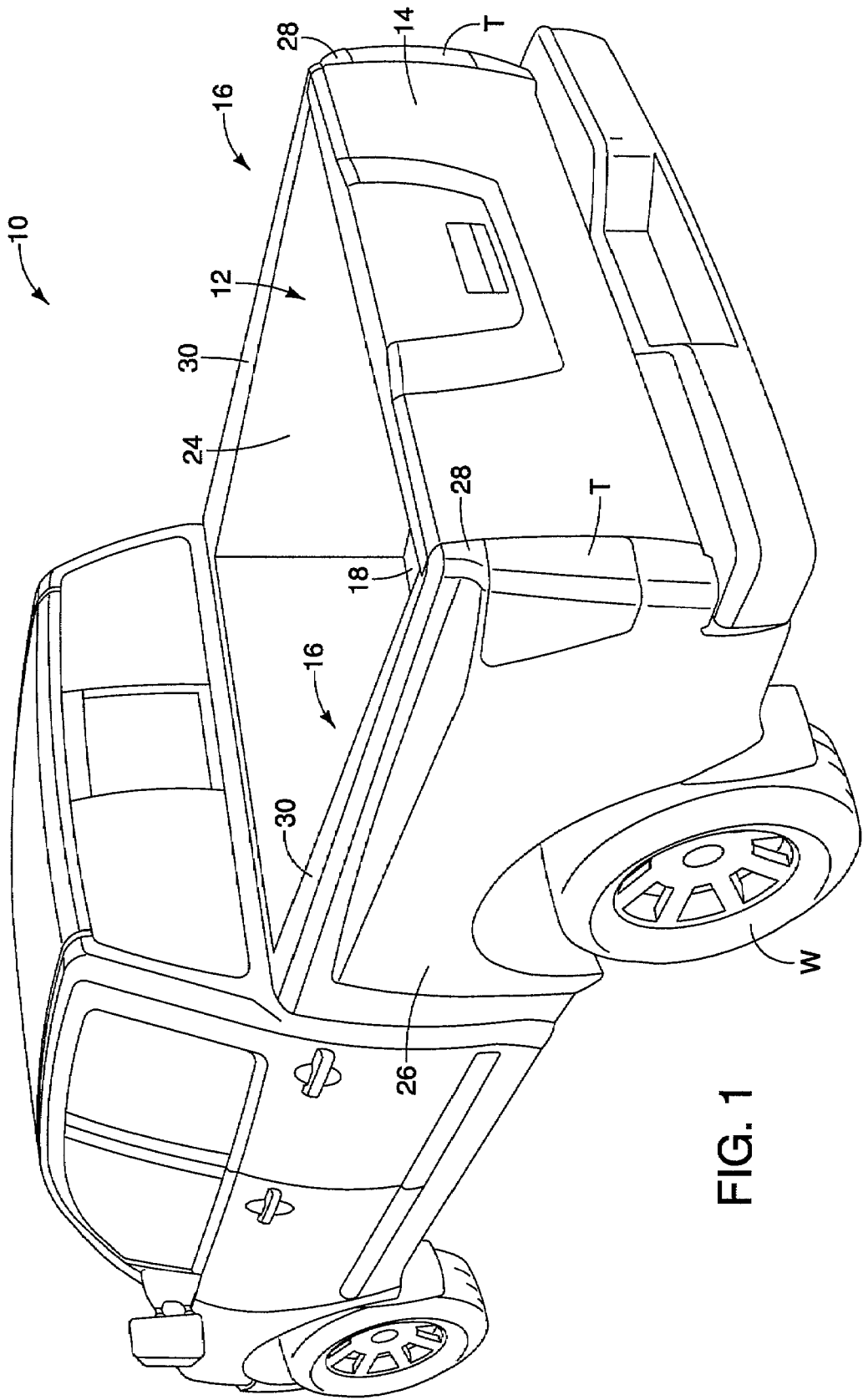
FIG. 1 is a perspective view of a vehicle that includes a sidewall structure of a cargo area that includes a concealed storage space in accordance with the present invention.

Referring initially to FIG. 1, a vehicle 10 is illustrated in accordance with a first embodiment of the present invention. The vehicle 10 is preferably a pickup truck that includes a cargo area 12 that is typically uncovered and that is accessible from a rear end of the vehicle 10 via a conventional hinged tailgate 14. The cargo area 12 has a pair of sidewall structures 16 and a cargo area floor panel 18. At least one of the side wall structures 16 includes a storage compartment 20 that is best shown in FIGS. 2 and 3 and described in greater detail below.

Figure 3:
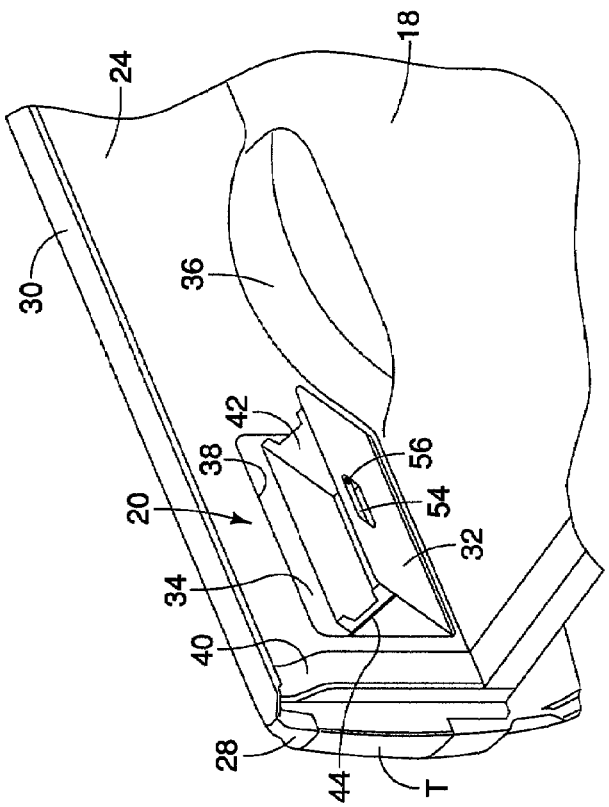
FIG. 3 is another fragmentary perspective view of the sidewall structure of the cargo area similar to FIG. 2 showing the door panel in an opened position revealing the storage space and a storage bin in accordance with the first embodiment of the present invention.
Figure 2:
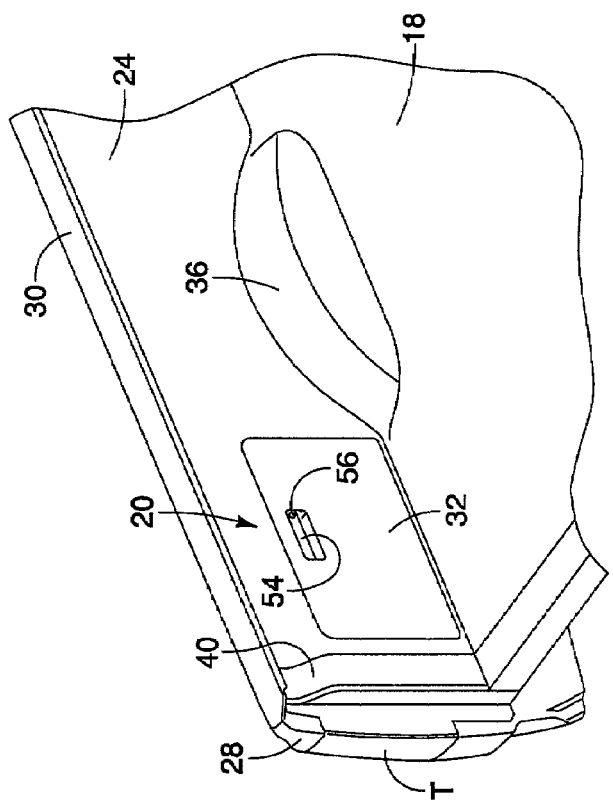
FIG. 2 is a fragmentary perspective view of the sidewall structure of the cargo area showing a door panel of a storage compartment in a closed position concealing the storage space in accordance with a first embodiment of the present invention.

In the first embodiment depicted in FIGS. 2 and 3, the storage compartment 20 is shown at a left rear portion of the vehicle 10. However, it should be understood from the drawings and the description herein that the storage compartment 20 can be provided at either the left or the right side of the cargo area 12 of the vehicle 10 (driver's side or passenger's side). Alternatively the storage compartment 20 can be provided at both sides of the cargo area 12 of the vehicle 10. Therefore, the description of one of the side wall structures 16 provided below applies to both of the side wall structures 16.

As best shown in FIGS. 2-5, the side wall structure 16 includes an inboard wall panel 24, an outboard wall panel 26, an end panel 28 (FIGS. 2 and 3), a rail panel portion 30 and a door panel 32. The inboard wall panel 24, the outboard wall panel 26 and the end panel 28 (FIGS. 2 and 3) are preferably vertically oriented or approximately vertically oriented. This approximate vertical orientation varies from vehicle to vehicle since some vehicles have rear end that is higher than a front end of the vehicle with the cargo area 12 in an unloaded condition. The end panel 28 extends between rear end edges of the inboard and outboard wall panels 24 and 26 and supports a conventional taillight assembly T. The end panel 28 and the rail panel portion 30 can be unitarily formed with one or the other of the inboard and outboard wall panels 24 and 26 and/or welded thereto in a conventional manner.

The wall rail panel portion 30 is preferably horizontally oriented or approximately horizontally oriented and extends between upper edges of the inboard and outboard wall panels 24 and 26. The inboard wall panel 24, the outboard wall panel 26, the end panel 28 and the wall rail panel portion 30 are preferably welded together and/or at least partially unitarily formed in a conventional manner to define the side wall structure 16. The cargo area floor panel 18 extends between the inboard wall panels 24 of the two separate ones of the side wall structures 16. The cargo area floor panel 18 is preferably welded to opposing ones of the inboard wall panels 24, extending between the two side wall structures 16, in a conventional manner.

Figure 5:
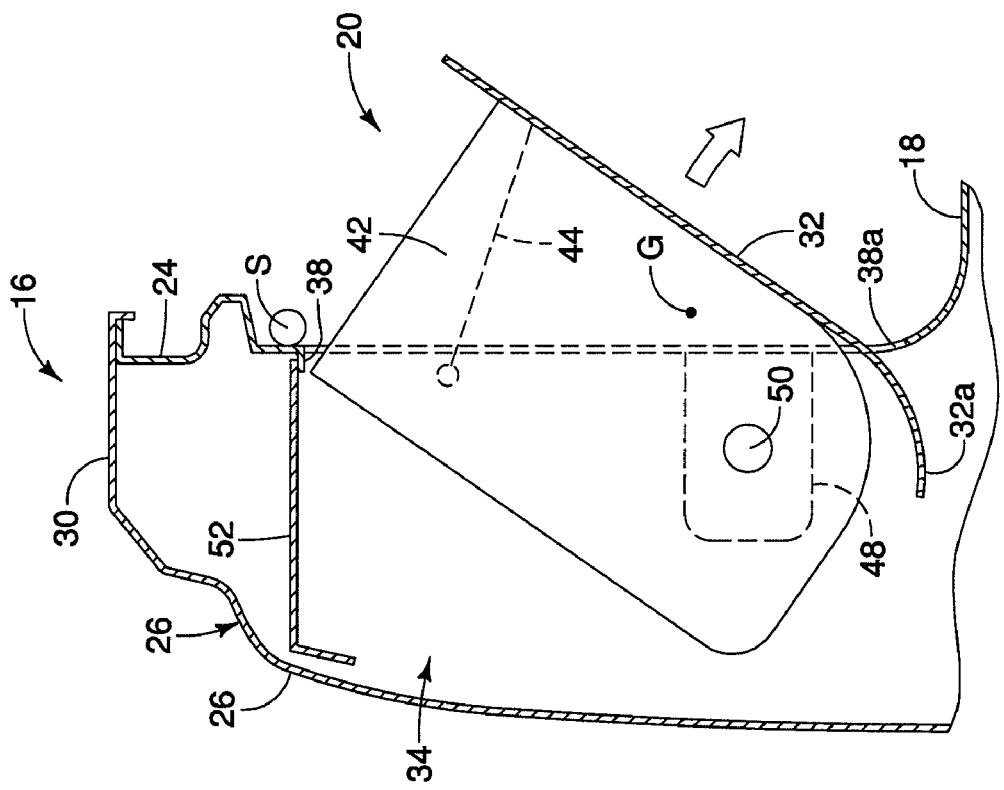
FIG. 5 is another cross-sectional view of the sidewall structure of the cargo area similar to FIG. 4, showing details of the sidewall structure with the door panel in the opened position with the storage bin at least partially extending out of the storage space in accordance with the first embodiment of the present invention.
Figure 4:
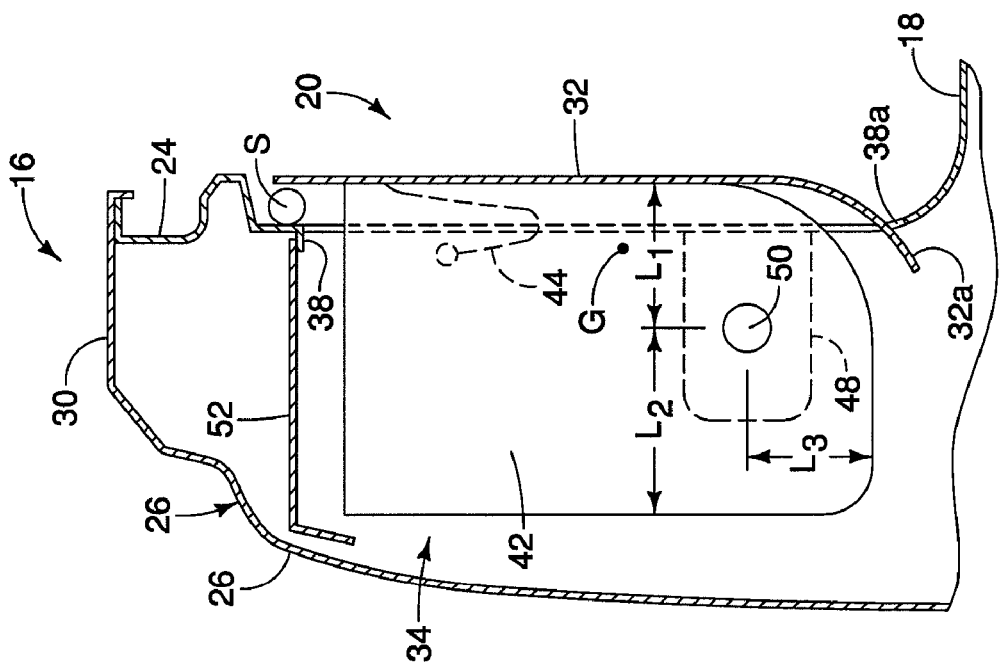
FIG. 4 is a cross-sectional view of the sidewall structure of the cargo area showing details of the sidewall structure with the door panel in the closed position with the storage bin concealed within the storage space within the sidewall structure in accordance with the first embodiment of the present invention.

As best shown in FIGS. 4 and 5, a hollow area or storage space 34 is defined between the inboard and outboard wall panels 24 and 26. The storage space 34 is confined to an area under the wall rail panel portion 30 and forward from the end panel 28.

The inboard wall panel 24 and the cargo area floor panel 18 are shaped or formed with a conventional wheel well 36. The wheel well 36 is basically a contoured projection shaped to protect the cargo area 12 from dirt and debris from a rear wheel W (shown in FIG. 1) of the vehicle 10. The storage space 34 is also confined to an area rearward from the wheel well 36. However, alternatively, the storage space 34 can be confined to an area forward from the wheel well 36 (not shown).

The inboard wall panel 24 includes an access opening 38 and a strut 40, as indicated in FIGS. 2 and 3. The access opening 38 is open to the storage space 34. The access opening 38 is located rearward from the wheel well 36, forward from the strut 40 and vertically above the cargo area floor panel 18, as indicated in FIG. 3. The access opening 38 includes a lower edge 38a, as shown in FIGS. 4 and 5. As indicated in FIGS. 2 and 3, the strut 40 is a conventional reinforcing structural formation of the sidewall structure 16. The strut 40 provides rigidity to the sidewall structure 16 and can also provide a stop for establishing the closing position of the tailgate 14.

With specific reference to FIGS. 2-5, a description of the storage compartment 20 is now provided. The storage compartment 20 includes the door panel 32, a storage bin 42, a movement restriction member 44, a pair of support brackets 48 (only one of the support brackets 48 is indicated in FIGS. 4 and 5), pivot pins 50 and a cover 52. In the first embodiment, the door panel 32 is arranged to move relative to the inboard wall panel 24 for movement between a closed position (FIGS. 2 and 4) overlaying the access opening 38 to conceal the storage space 34 and an opened position (FIGS. 3 and 5) to expose the storage space 34 and the storage bin 42. The door panel 32 is a generally flat panel with a curved lower end 32a. With the door panel 32 in the closed position shown in FIG. 4, the curved lower end 32a partially extends into the storage space 34 and a small gap is defined between the curved lower end 32a of the door panel 32 and the lower edge 38a of the access opening 38. Preferably, the curvature of the curved lower end 32a arcs with the pivot pins 50 as an approximate center. Thus, when the storage compartment 20 is pivoted about the pivot pins 50 to the opened position (FIG. 5), the curved lower end 32a of the door panel 32 completely extends into the storage space 34. Further, a small gap is defined between the curved lower end 32a of the door panel 32 and the lower edge 38a of the access opening 38 that remains approximately constant with the door panel 32 in either the opened position or the closed position thereby preventing the door panel 32 from jamming in the presence of debris. As well, by minimizing the size of the small gap between the curved lower end 32a of the door panel 32 and the lower edge 38a of the access opening 38 infusion of debris and contaminants into the storage space 34 can be minimized. Movement of the door panel 32 is restricted by the movement restriction member 44 which extends between the door panel 32 and the inboard wall panel 24, as shown in FIGS. 4 and 5.

The storage bin 42 is fixed to the door panel 32 for movement therewith such that with the door panel 32 in the closed position the storage bin 42 is disposed within the storage space 34, as shown in FIGS. 2 and 4. Further, with the door panel 32 in the opened position, the storage bin 42 at least partially extends out of the storage space 34, as shown in FIGS. 3 and 5. As indicated in FIGS. 4 and 5, the door panel 32 and the storage bin 42 are pivotally supported to the inboard wall panel 24 by the pivot pins 50 which extends through respective ones of the support brackets 48. The support bracket 48 is fixed to an interior surface of the inboard wall panel 24 and extends into the storage space 34.

The storage bin 42 has a box-like structure with an opening at an upper end thereof accessible with the door panel 32 in the opened position. The cover 52 is fixed to an inner surface of the inboard wall panel 24 and covers the opening of the storage bin 42 when the storage bin 42 and the door panel 32 are in the closed position, as shown in FIG. 4. The cover 52 prevents articles placed within the storage bin 42 from moving out of the storage bin 42 in instances where a bump in the road causes such articles to move. The cover 52 also prevents water and debris from entering the storage bin 42. For example, water and debris sprayed by rotation of the rear wheel W can spray against and around the storage bin 42. The cover 52 blocks movements of such water and debris from entering the storage bin 42.

As indicated in FIGS. 2 and 3, the door panel 32 includes a latch mechanism 54 with a locking mechanism 56. The latch mechanism 54 includes a latching member or latching members (not shown) that are configured to move between a latched orientation (FIG. 2) and an unlatched orientation (FIG. 3). With the latch mechanism 54 in a latched orientation, the latch mechanism engages an inner portion of the inboard wall panel 24 in order to retain the door panel 32 in the closed position. In the closed position, a seal S (shown schematically in FIGS. 4 and 5) is disposed between the door panel 32 and the inboard wall panel 24 thus further protecting the articles stored in the storage bin 42 from moisture and debris. The locking mechanism 56 can be used to lock and unlock the latch mechanism 54 in order to keep the contents of the storage bin 42 secure.

The door panel 32 is preferably made of metal and can be made of the same metal as the inboard wall panel 24. The storage bin 42 is preferably made of a plastic or polymer material. Consequently, the storage bin 42 is relatively light compared to the door panel 32. Thus, the center of gravity G of combined weights of the door panel 32 and storage bin 42 is typically between the door panel 32 and the pivot pins 50 of the storage bin 42.

The pivot pins 50 define a pivot axis that is positioned such that the storage bin 42 is biased by gravity to move toward the opened position with the latch mechanism 54 in an unlatched orientation. Specifically, the pivot pins 50 are positioned a distance $L_1$ from the outer surface of the door panel 32, a distance $L_2$ from the inner most portion of the storage bin 42 and a distance $L_3$ from the bottom of the storage bin 42. Since the door panel 32 weighs more than the storage bin 42 (when empty), the distance $L_2$ is greater than the distance $L_1$. Further, with the center of gravity G located between the pivot pins 50 and the door panel 32, the storage bin 42 and door panel 32 are biased by gravity to cause them to move to the opened position when unlatched. In other words, the specific distances $L_1$, $L_2$ and $L_3$ are determined such that when the latch mechanism 54 is manipulated to the unlatched orientation, the storage bin 42 and the door panel 32 is biased by gravity to move toward the opened position.

In the first embodiment, the door panel 32 is shaped and contoured to approximately conform to the shape and contours of the inboard wall panel 24. Thus, the storage compartment 20 does not interfere with the storage capacity of the cargo area 12. Further, the storage compartment 20 is concealed by the appearance and contours of the door panel 32.

Second Embodiment

Referring now to FIGS. 6-14, the vehicle 10 with a storage compartment assembly 120 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 8:
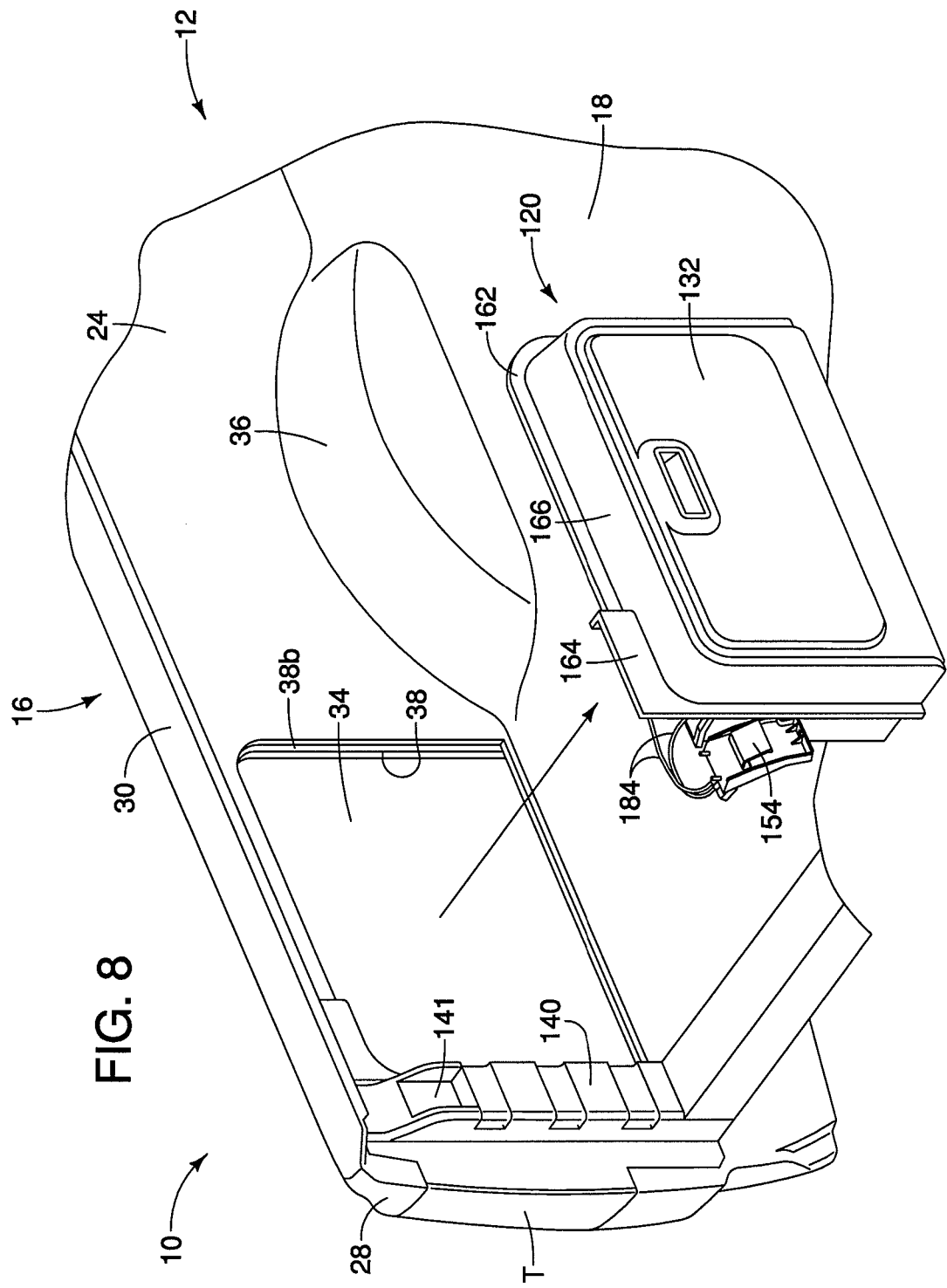
FIG. 8 is another fragmentary perspective view of the sidewall structure of the cargo area similar to FIGS. 6 and 7 showing the storage compartment assembly removed from the sidewall structure in accordance with the second embodiment of the present invention.

It should be apparent from the drawings and the description herein that the vehicle 10 is basically unchanged in the second embodiment. The cargo area 12, the sidewall structures 16 (only one is shown) and the cargo area floor panel 18 are basically the same as in the first embodiment. While the second embodiment includes a tailgate, the tailgate is removed from the drawings to provide greater clarity. As with the first embodiment described above, the side wall structure 16 includes the inboard wall panel 24, the outboard wall panel 26 (not shown), the end panel 28 and the rail panel portion 30. Further, the inboard wall panel 24 and the cargo area floor panel 18 also include the wheel well 36. The inboard wall panel 24 of the side wall structure 16 also includes the access opening 38 (shown in FIG. 8) but has a modified strut 140. The strut 140 is structurally identical to the strut 40 of the first embodiment, except that the strut 140 includes an opening 141 whose purpose is described below. Further, as shown in FIG. 8, the inboard wall panel 24 is provided with a recess 38b that extends at least part way around the access opening 38. The recess 38b is an optional feature whose purpose is described below. In other words, the recess 38b is not required, but is desirable in some applications of the present invention.

As with the first embodiment, in the second embodiment the storage space 34 (FIG. 8) is defined within the area confined by the inboard wall panel 24, the outboard wall panel 26, the end panel 28 and the rail panel portion 30 rearward from the wheel well 36.

However in the second embodiment, the storage compartment assembly 120 is a modular unit or pre-constructed storage assembly that is installed to the inboard wall panel 24 such that a portion of the storage compartment assembly 120 extends into the access opening 38. In other words, the storage compartment assembly can be assembled as a stand alone unit installed in the sidewall structure 16 or can be constructed as an integral part of the sidewall structure 16. Further, in the second embodiment, the storage compartment assembly 120 can be installed as an aftermarket item, with the inboard wall panel 24 being cut in a conventional manner to form the access opening 38.

The storage compartment assembly 120 basically includes a framing member 122, a door panel 132, a storage bin 142, a movement restriction member 144, support brackets 148, pivot brackets 149, pivot pins 150, a cover 152, a latch mechanism 154 and a seal S.

Figure 9:
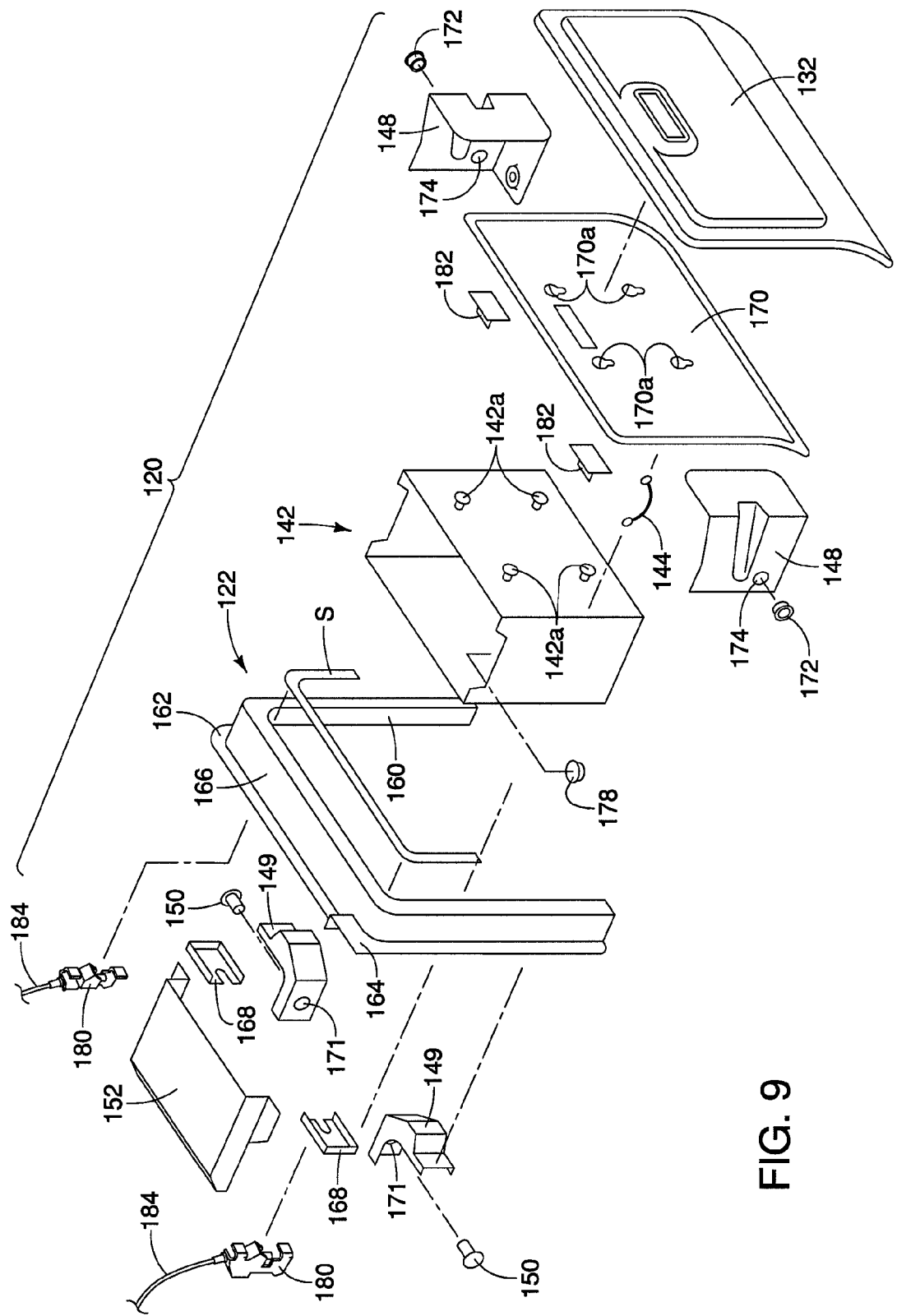
FIG. 9 is an exploded perspective view of the storage compartment assembly shown removed from the sidewall structure showing the various features of the storage compartment assembly such as a framing member, a storage bin, a hidden storage bin cover, the door panel and elements of a latch mechanism in accordance with the second embodiment of the present invention.

As best shown in FIG. 9, the framing member 122 is basically a rigid U-shaped member (or assembly of members) that is dimensioned to attach to the inboard wall panel 24 such that the framing member 122 generally surrounds the access opening 38. The framing member 122 is preferably made of a metallic material and basically includes a central opening 160 (between the legs of the U-shape), an attachment flange 162, contoured portions 164, an extension portion 166 and latch support brackets 168. The framing member 122 is fixed to the inboard wall panel 24 and dimensioned to reinforce the portion of the inboard wall panel 24 surrounding the access opening 38. The framing member 122, the pivot brackets 149 and the latch support brackets 168 basically define a support structure for the storage compartment assembly 120. Once the framing member 122 is fixed to the inboard wall panel 24 (and in effect becomes part of the inboard wall panel 24), it serves as a support structure for the door panel 132, the storage bin 142 and portions of the latch mechanism 154.

The central opening 160 can be aligned with the access opening 38 with the framing member 122 installed on the inboard wall panel 24 or alternatively can be offset. The attachment flange 162 is shaped to conform to the recess 38b that extends at least part way around the access opening 38. The attachment flange 162 fits into the recess 38b such that the attachment flange 162 is flush with the remainder of the exposed surface of the inboard wall panel 24 rearward of the wheel well 36. In other words, the attachment flange 162 is shaped to lie flush against the corresponding portions of the inboard wall panel 24 about the access opening 38. The attachment flange 162 can include fastener apertures (not shown) for fastening to the inboard wall panel 24 or can include weld points such that the attachment flange 162 can be welded to the inboard wall panel 24. The contoured portions 164 are optional features provided to conform to irregularities in the inboard wall panel 24. It should be understood that the contoured portions 164 can have any of a variety of shapes and forms, depending upon the shapes and surface features and contours of the inboard wall panel 24. Since the storage compartment assembly 120 can be installed to the inboard wall panel 24 in the factory or as an after-market kit, the overall shape and features of the framing member 122 can vary from vehicle application to vehicle application.

In an alternative embodiment, the framing member 122 can be formed integrally with the inboard wall panel 24 such that there is no seam between the framing member 122 and the inboard wall panel 24.

In yet another alternative embodiment where the inboard wall panel 24 is formed without the recess 38b, the attachment flange 162 can lie against the inboard wall panel 24.

Figure 6:
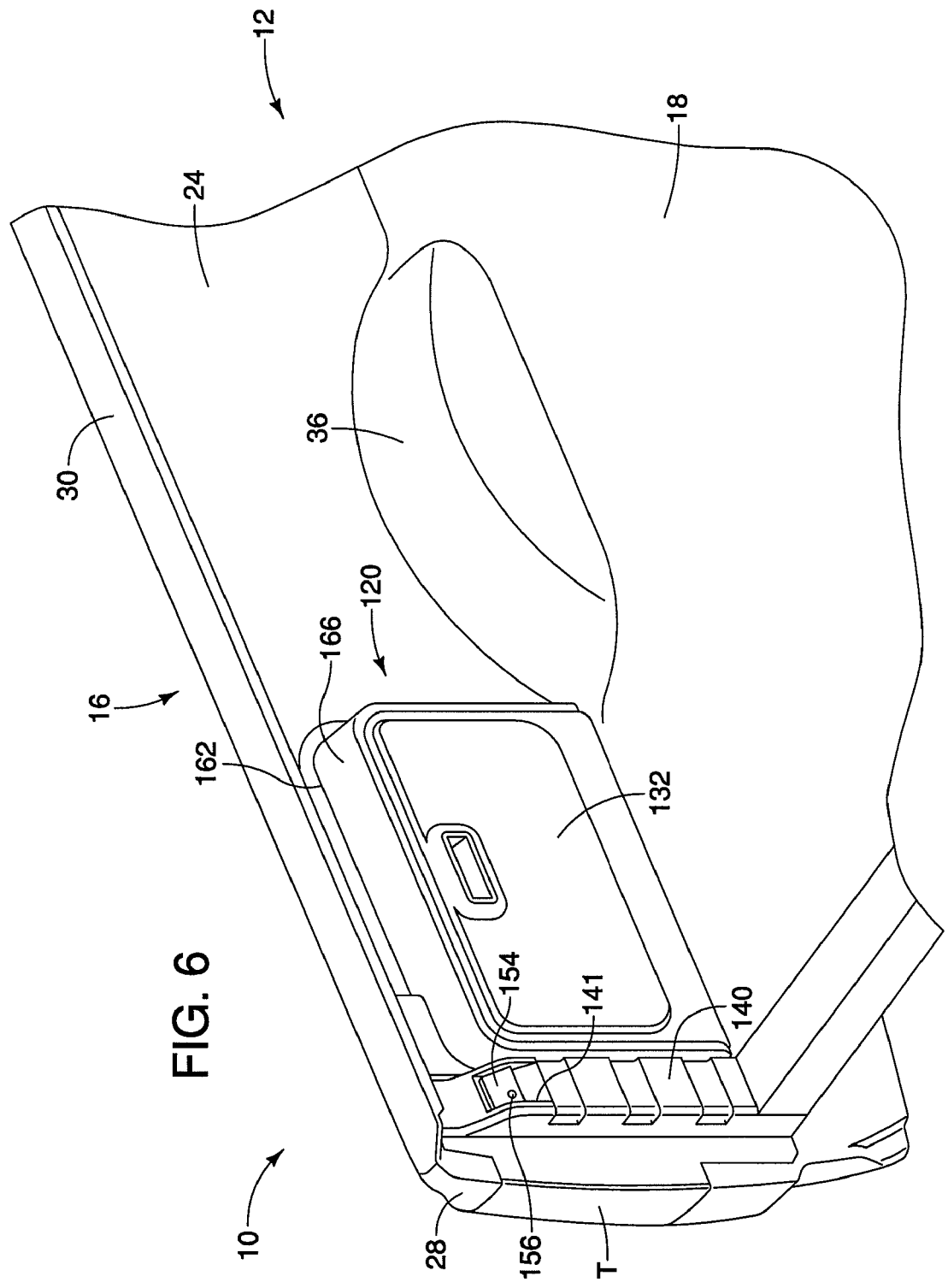
FIG. 6 is a fragmentary perspective view of the sidewall structure of the cargo area showing a door panel of a storage compartment assembly in a closed position concealing the storage space in accordance with a second embodiment of the present invention.
Figure 7:
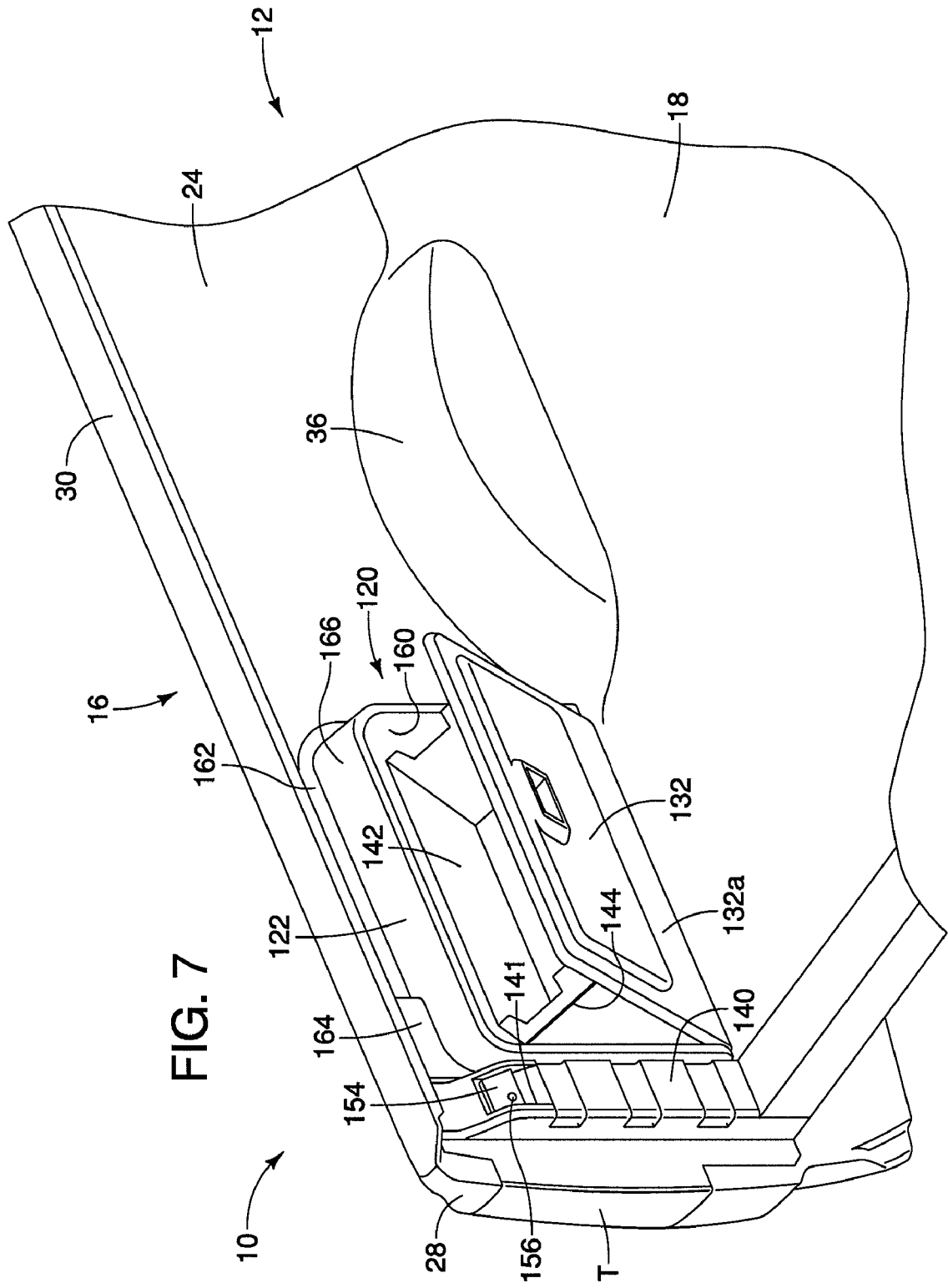
FIG. 7 is another fragmentary perspective view of the sidewall structure of the cargo area similar to FIG. 6 showing the door panel of the storage compartment assembly in an opened position revealing the storage space and a storage bin in accordance with the second embodiment of the present invention.

As indicated in FIGS. 6 and 7, the extension portion 166 of the framing member 122 extends away from the attachment flange 162 and the surface of the inboard wall panel 24. Consequently, the framing member 122 extends outward away from the inboard wall panel 24 into the cargo area 12 of the vehicle 10. However, the extension portion 166 of the framing member 122 is dimensioned such that with the door panel 132 in a closed position (FIG. 6), the storage compartment assembly 120 preferably does not extend inward beyond the end of the strut 40. Further, with the door panel 132 in a closed position, the storage compartment assembly 120 preferably does not extend inward beyond an inner edge of the wheel well 36. Hence, the storage compartment assembly 120 does not interfere with loading or unloading of cargo to and from the cargo area 12 and does not noticeably reduce the cargo capacity of the cargo area 12.

Figure 12:
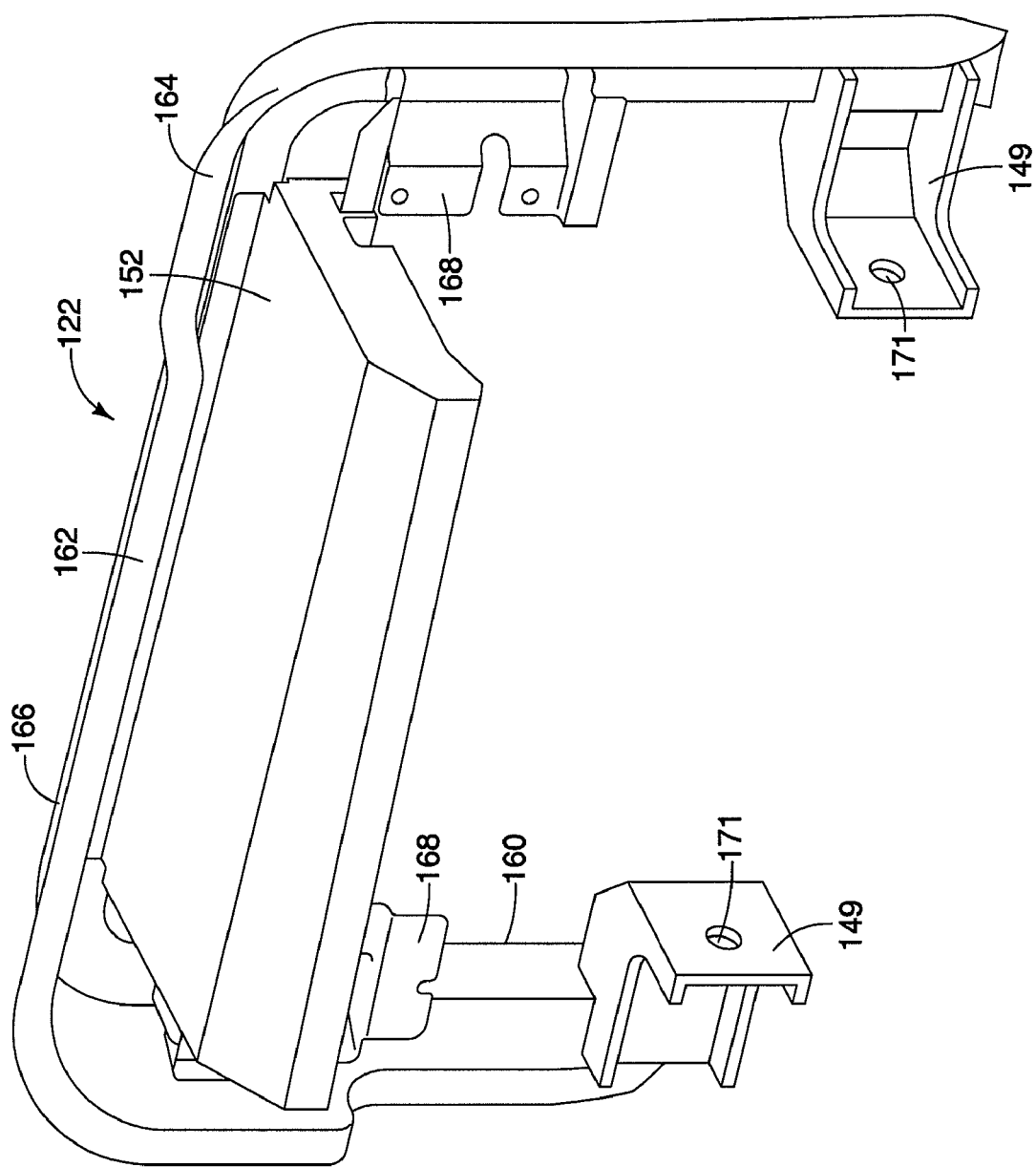
FIG. 12 is a perspective view of an outboard side of the framing member of the storage compartment assembly shown removed from the sidewall structure, showing pivot brackets that support the storage bin and latch support brackets that support portions of the latch mechanism in accordance with the second embodiment of the present invention.

As best shown in FIG. 12, the latch support brackets 168 are welded or otherwise fastened to an interior surface of the framing member 122 in order to support a portion of the latch mechanism 154, as described below.

The door panel 132 can be similar to the door panel 32 of the first embodiment and is preferably made of metal, similar or identical to the inboard wall panel 24. The door panel 132 is configured and arranged to move relative to the framing member 122 and the inboard wall panel 24 for movement between a closed position overlaying the access opening 38 and the central opening 160 to conceal the storage space 34 (see FIG. 6) and an opened position to expose the storage space 34 and the storage bin 142 (see FIG. 7). The door panel 132 includes a curved lower end 132a that is configured and shaped in a manner similar to the curved lower end 32a of the first embodiment. Movement of the door panel 132 is restricted by the movement restriction member 144 which extends between the door panel 132 and the framing member 122 (and hence the inboard wall panel 24), as indicated in FIG. 7. The door panel 132 includes an inner support panel 170 fixed to an inner side of the door panel 132 in order to provide rigidity and strength to the door panel 132. Both the door panel 132 and the inner support panel 170 include a grip opening, as shown in FIG. 9. The inner support panel 170 and the door panel 132 are joined to one another along their respective outer peripheral edges but are spaced apart in a central region thereof. The inner support panel 170 includes a plurality of keyhole shaped openings 170a that are open to this central region.

The storage bin 142 is fixed to the inner support panel 170 and the door panel 132 by a plurality of projections 142a that are configured to interlock with corresponding ones of the plurality of keyhole shaped openings 170a. Specifically, the projections 142a extend into a large portion of the keyhole shaped openings 170a and into the central region between the inner support panel 170 and the door panel 132, then lock to the narrow portions of the keyhole shaped openings 170a. The storage bin 142 is therefore configured for movement with the door panel 132 and the inner support panel 170 such that with the door panel 132 in the closed position the storage bin 142 is disposed within the storage space 34, as shown in FIG. 6. Further, with the door panel 32 in the opened position, the storage bin 42 at least partially extends out of the storage space 34, as shown in FIG. 7. The support brackets 148 are welded or otherwise fastened to lower portions of the inner support panel 170 and/or the door panel 132.

As best shown in FIG. 9, various structural elements allow the storage bin 142 to pivot relative to the framing member 122 (and hence the inboard wall panel 24). Specifically, the pivot brackets 149 and the pivot pins 150 support the storage bin 142 and the door panel 132 for pivotal movement. Hence the pivot brackets 149 serve as a pair of support members configured to movably support the storage bin 142 and the door panel 132.

The pivot brackets 149 are welded or otherwise fastened by fasteners to an inner side of the framing member 122 of the door panel 132. The pivot pins 150 extend through apertures 171 in the pivot brackets 149 and through hinge bushings 172 which extend through corresponding apertures 174 in the support bracket 148.

Figure 14:
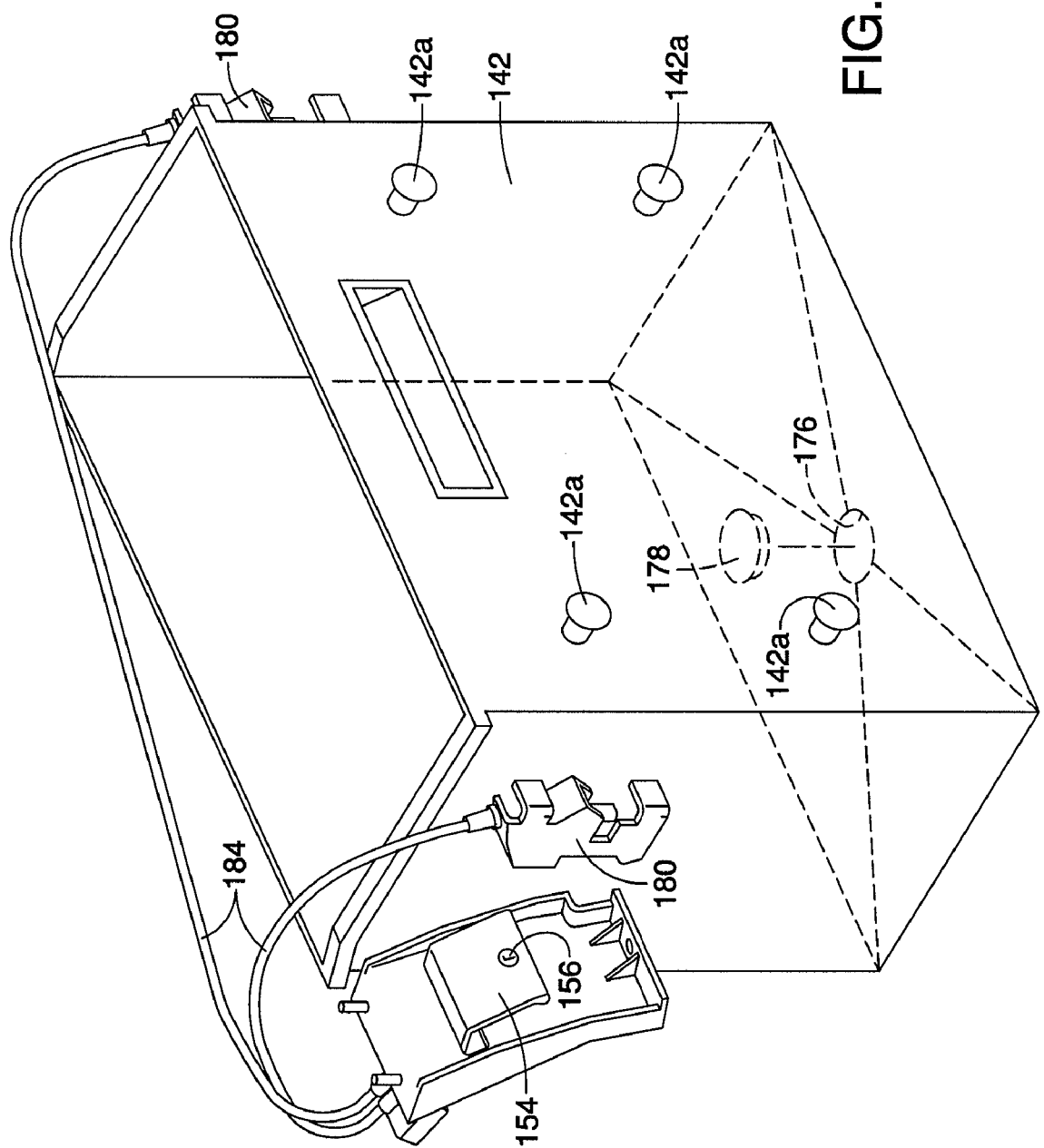
FIG. 14 is a perspective view of an inboard side of the storage bin of the storage compartment assembly shown removed from the storage compartment assembly and the door panel along with the latching mechanism, showing details of the storage bin and showing clasp devices connected to the latch mechanism by Bowden-type cables in accordance with the second embodiment of the present invention.
Figure 17:
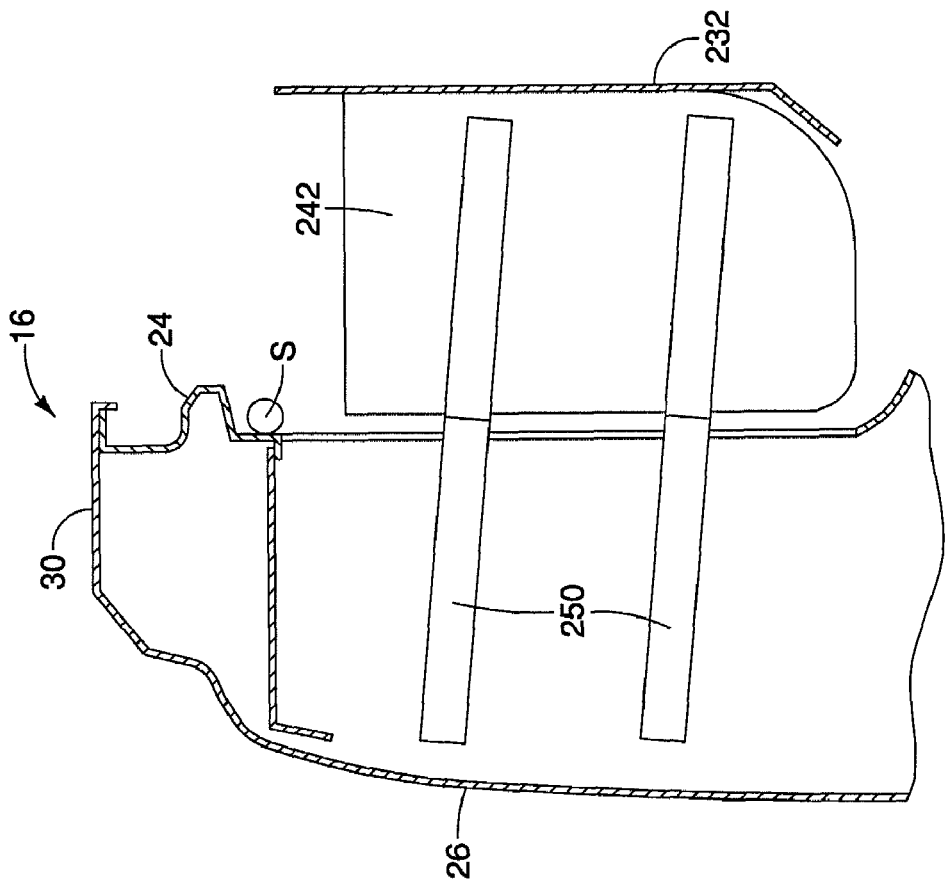
FIG. 17 is a cross-sectional view of the sidewall structure of the cargo area showing details of the sidewall structure with the door panel in the closed position with the storage bin concealed within the storage space within the sidewall structure in accordance with the third embodiment of the present invention.
Figure 18:
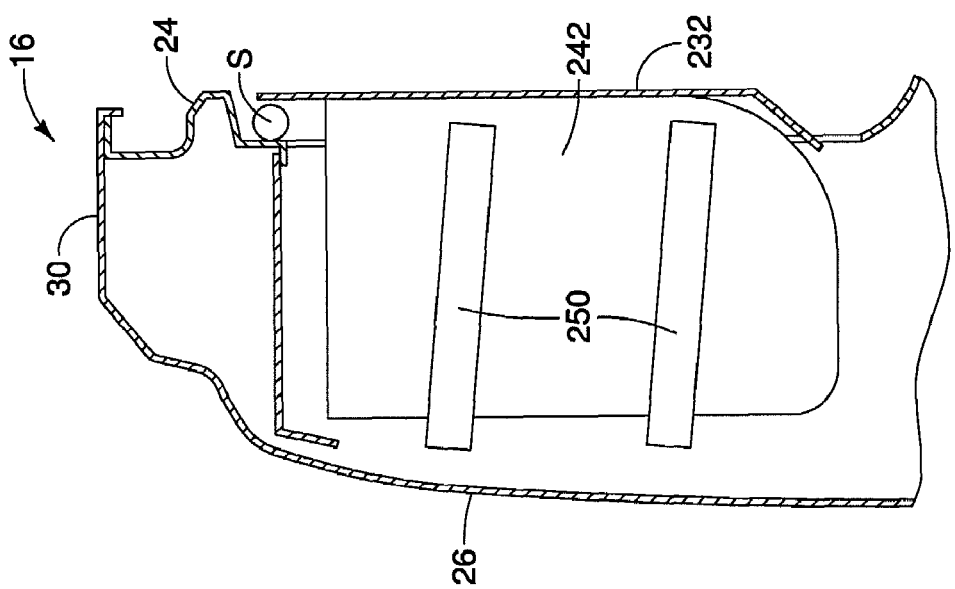
FIG. 18 is another cross-sectional view of the sidewall structure of the cargo area similar to FIG. 17, showing details of the sidewall structure with the door panel in the opened position with the storage bin extending out of the storage space in accordance with the third embodiment of the present invention.
Figure 20:
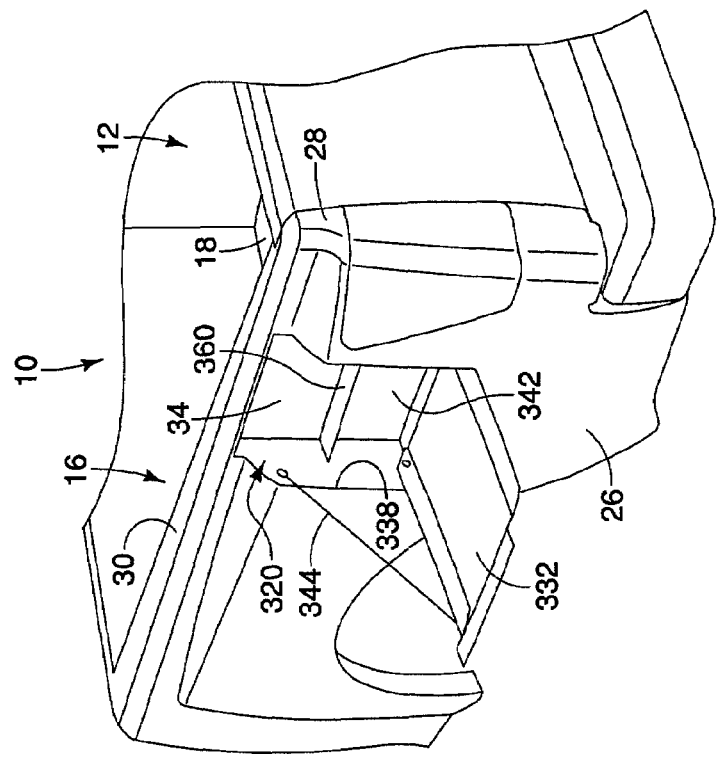
FIG. 20 is another fragmentary perspective view of the sidewall structure of the cargo area similar to FIG. 19 showing the door panel in an opened position revealing the storage space in accordance with the fourth embodiment of the present invention.
Figure 19:
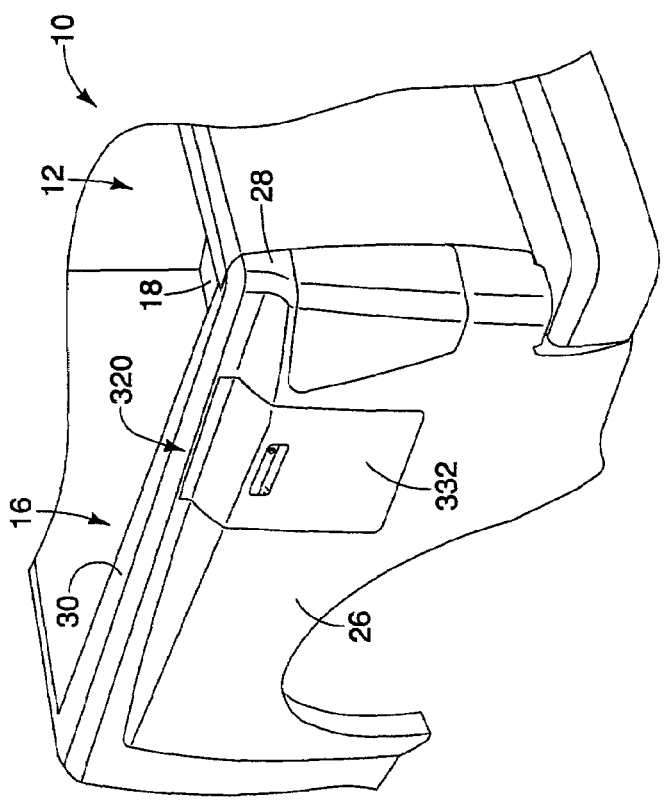
FIG. 19 is a fragmentary perspective view of the sidewall structure of the cargo area showing a door panel of a storage compartment in a closed position concealing the storage space in accordance with a fourth embodiment of the present invention.
Figure 22:
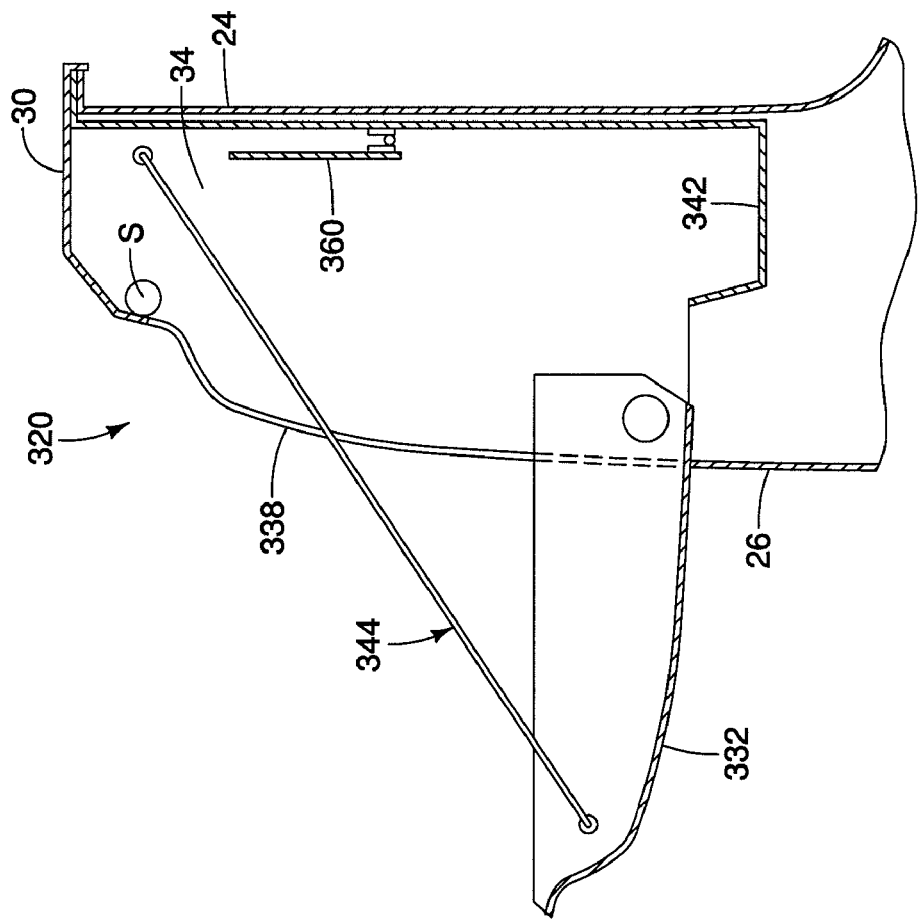
FIG. 22 is another cross-sectional view of the sidewall structure of the cargo area similar to FIG. 21, showing details of the sidewall structure with the door panel in the opened position in accordance with the fourth embodiment of the present invention.
Figure 21:
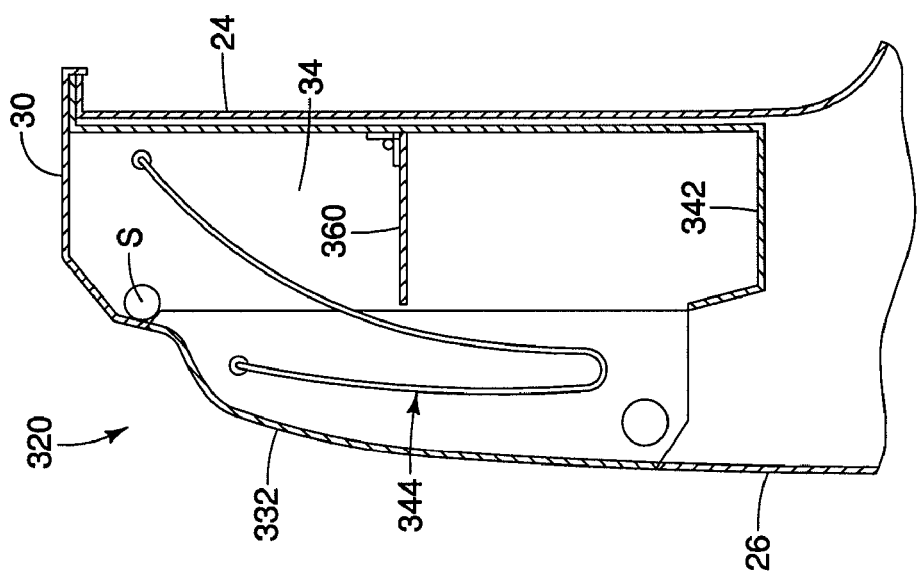
FIG. 21 is a cross-sectional view of the sidewall structure of the cargo area showing details of the sidewall structure with the door panel in the closed position in accordance with the fourth embodiment of the present invention.
Figure 24:
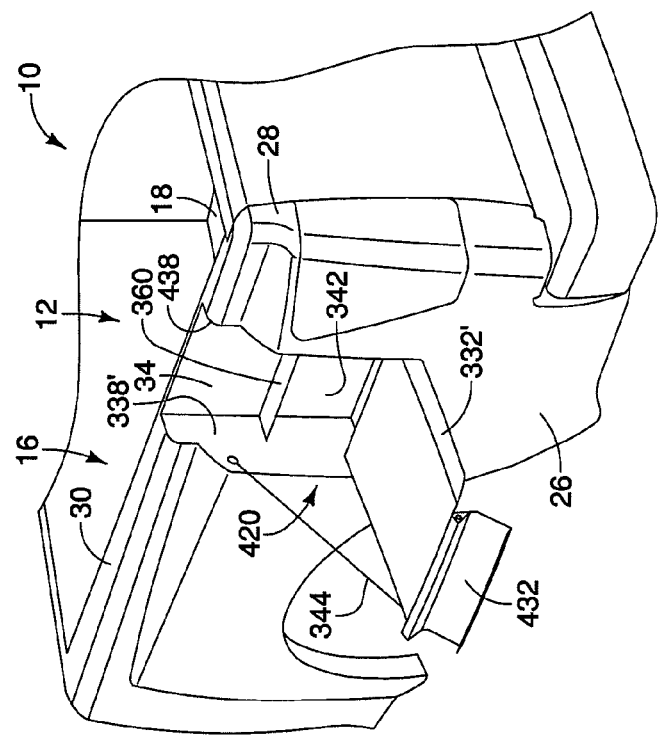
FIG. 24 is another fragmentary perspective view of the sidewall structure of the cargo area similar to FIG. 23 showing the two part door panel in an opened position revealing the storage space in accordance with the fifth embodiment of the present invention.
Figure 23:
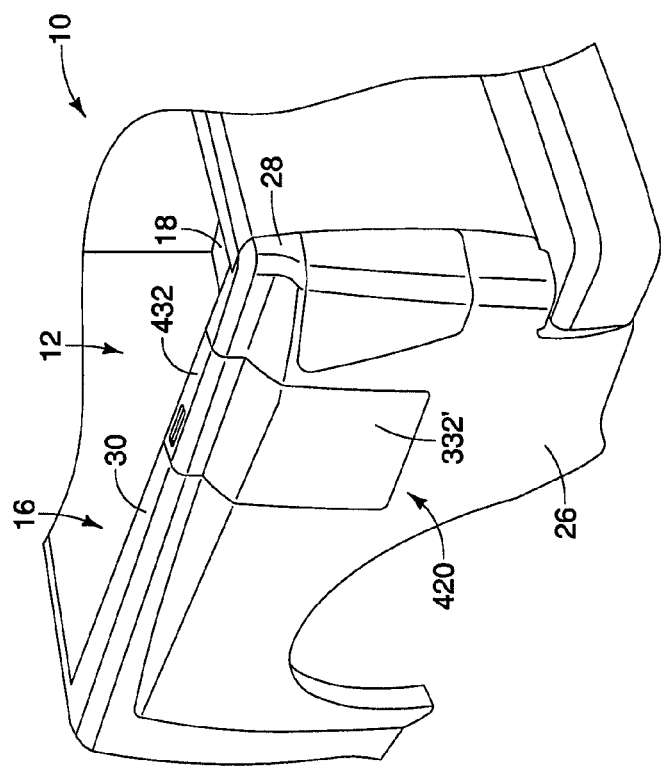
FIG. 23 is a fragmentary perspective view of the sidewall structure of the cargo area showing a two part door panel of a storage compartment in a closed position concealing the storage space in accordance with a fifth embodiment of the present invention.
Figure 26:
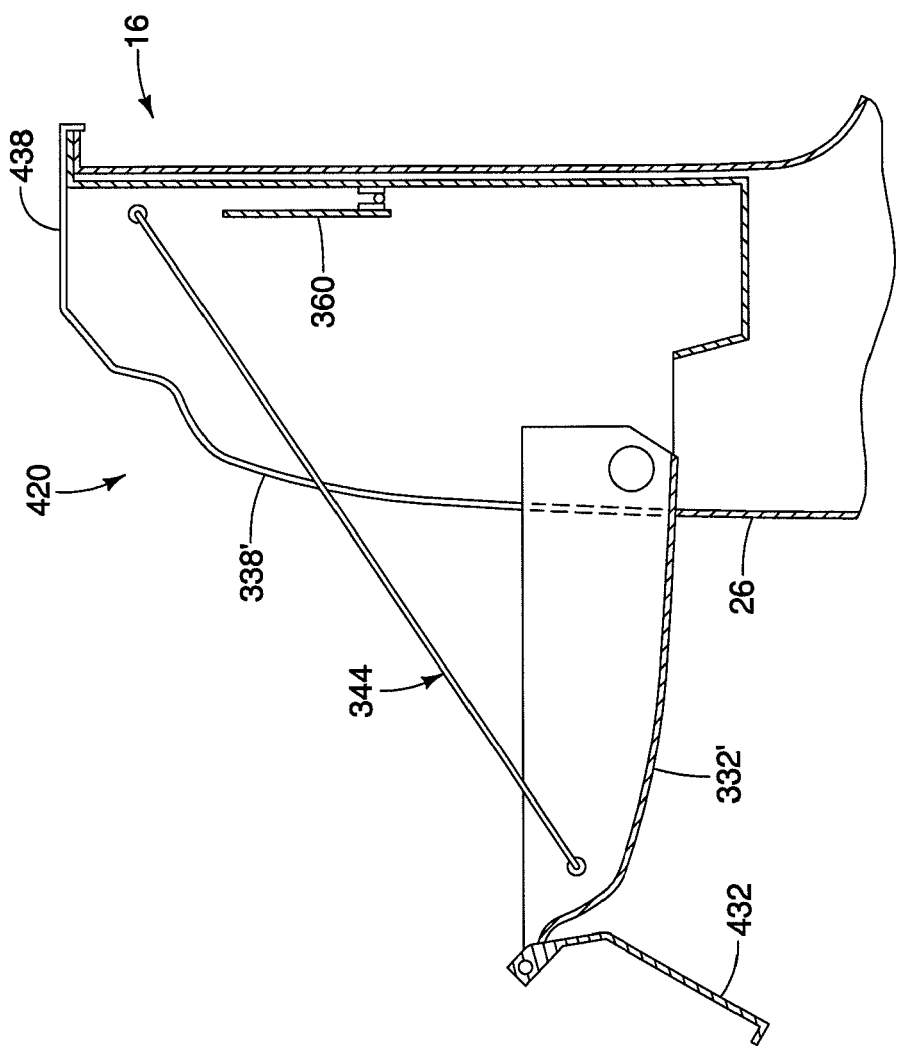
FIG. 26 is another cross-sectional view of the sidewall structure of the cargo area similar to FIG. 25, showing details of the sidewall structure with the door panel in the opened position in accordance with the fifth embodiment of the present invention.
Figure 25:
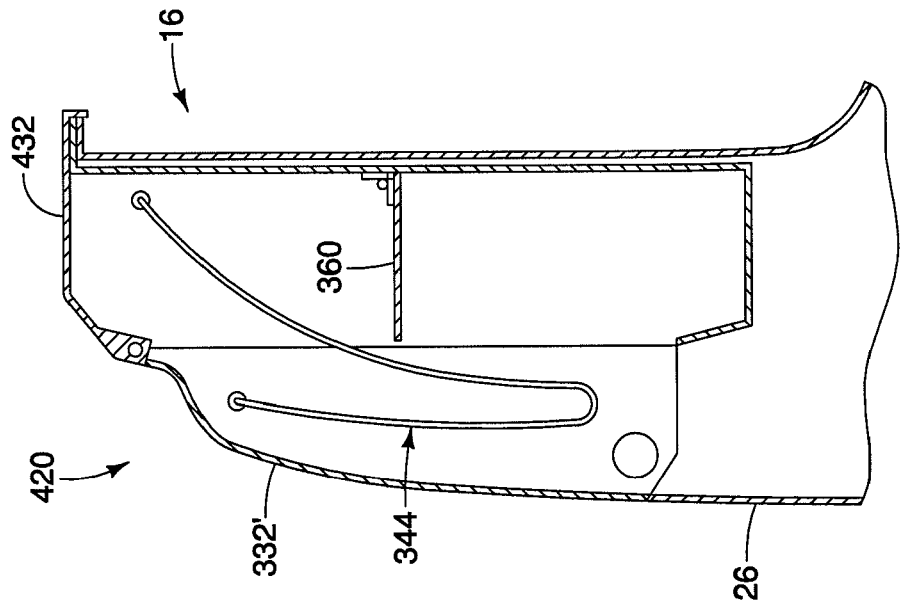
FIG. 25 is a cross-sectional view of the sidewall structure of the cargo area showing details of the sidewall structure with the two part door panel in the closed position in accordance with the fifth embodiment of the present invention.

As best shown in FIG. 14, the storage bin 142 has a box-like structure with an opening at an upper end thereof accessible with the door panel 132 in the opened position. The storage bin 142 also includes a drain hole 176 and a drain plug 178. Consequently, the storage bin 142 can hold ice and/or water and serve as a cooler. The drain plug 178 can be removed to drain and/or rinse the storage bin 142 after usage. The storage bin 142 is preferably made of a plastic or polymer material. Consequently, the storage bin 142 is relatively light compared to the door panel 132.

Figure 10:
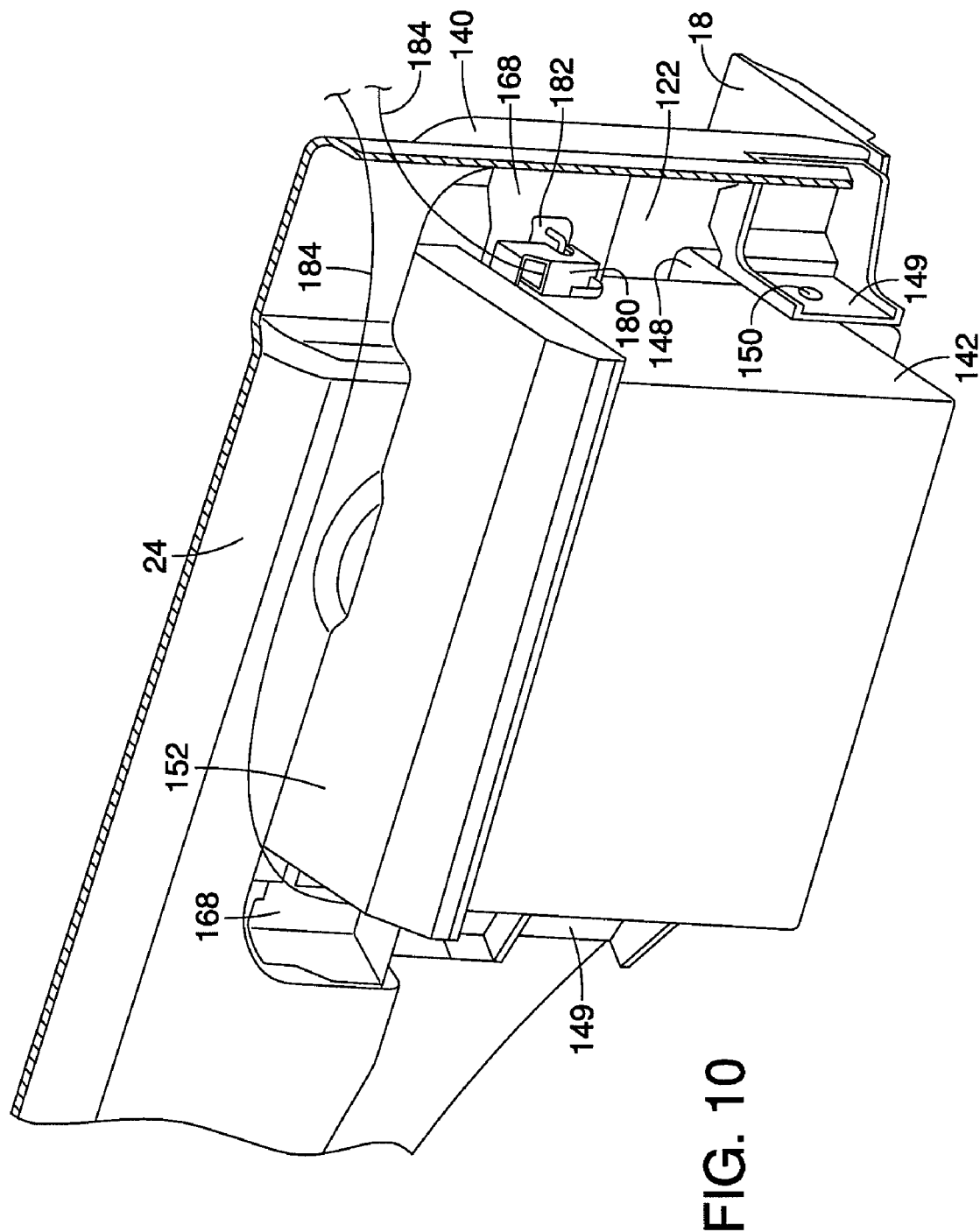
FIG. 10 is a perspective cross-sectional view of an outboard side of the sidewall structure of the cargo area with an outboard wall panel of the sidewall structure cutaway to reveal the storage space within the sidewall structure and features of the storage compartment assembly such as the hidden storage bin cover, the storage bin and portions of the latch mechanism in accordance with the second embodiment of the present invention.

As best shown in FIG. 10, the cover 152 is fixed to an inner surface of the framing member 122 (and hence the inboard wall panel 24). The cover 152 is dimensioned to cover the opening of the storage bin 142 when the storage bin 142 and the door panel 132 are in the closed position, as shown in FIG. 10. The cover 152 prevents such rain, water and/or debris from entering the storage bin 142. For example, water and debris sprayed by rotation of the rear wheel W can spray against and around the storage bin 142. The cover 152 blocks movements of such water and debris from entering the storage bin 142. Since the cover 152 is concealed within the storage space 34, the storage bin cover 152 is hidden.

As best shown in FIGS. 9-11, 13 and 14, the storage compartment assembly 120 includes the latch mechanism 154 with a locking mechanism 156. The latch mechanism 154 is installed in the opening 141 of the strut 140. Hence, the latch mechanism 154 is located remote from the storage compartment assembly 120. In other words, the latch mechanism 154 is an actuating device that is spaced apart from the storage compartment 120.

Figure 11:
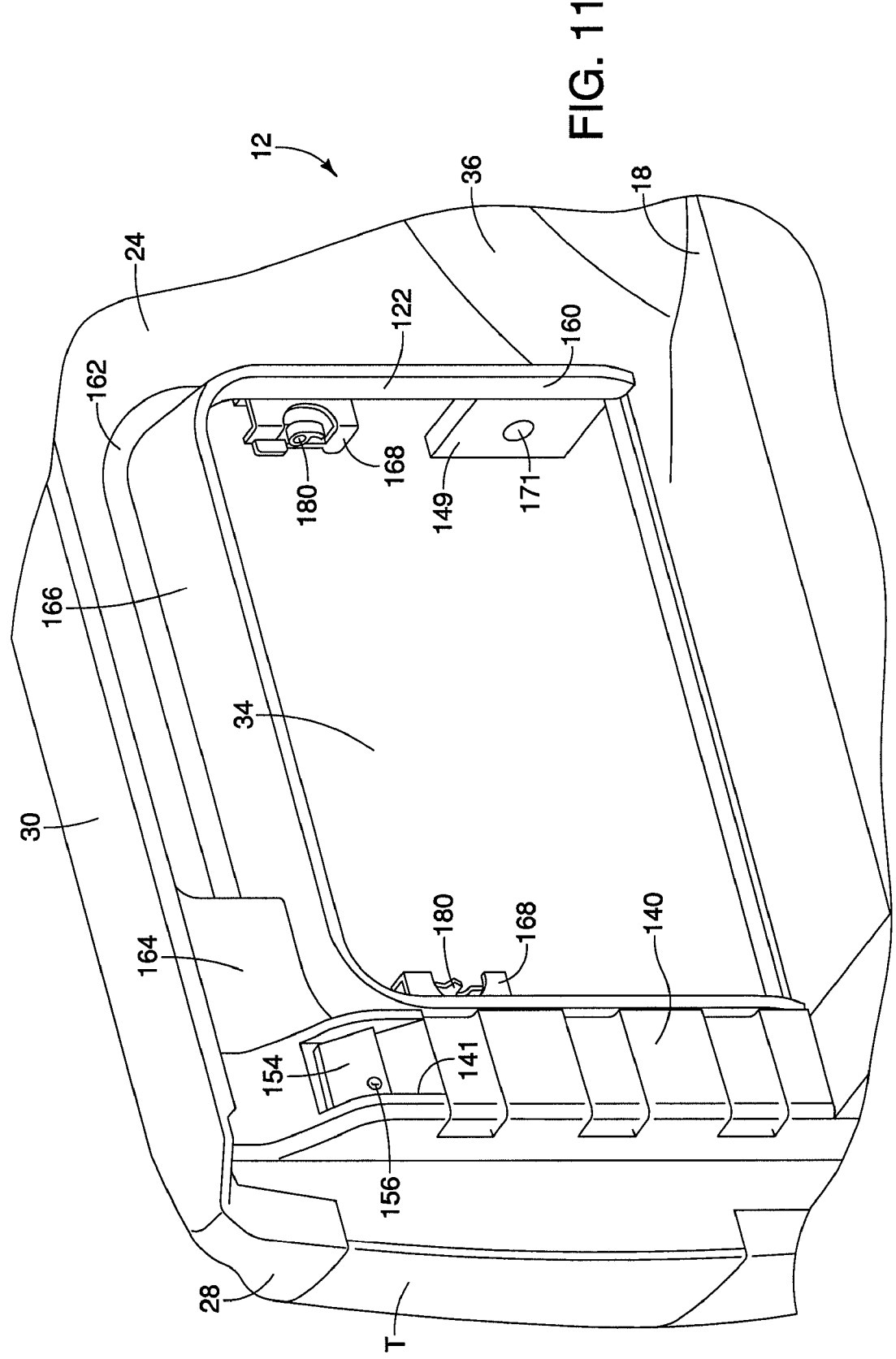
FIG. 11 is a perspective view of an inboard side of the sidewall structure of the cargo area with the door panel and storage bin removed to reveal the storage space within the sidewall structure and features of the storage compartment assembly such as the framing member and portions of the latch mechanism in accordance with the second embodiment of the present invention.

The latch mechanism 154 operates with several latching components, such as clasp devices 180, bar members 182 and Bowden-type cables 184. As shown in FIG. 11 and indicated in FIG. 9, the clasp devices 180 are attached by fasteners (not shown) to the latch support brackets 168 of the framing member 122 adjacent to the central opening 160. Since the framing member 122 is fixed to the inboard wall panel 24, the clasp devices 180 of the latch mechanism 154 are supported by the inboard wall panel 24.

In FIG. 14, the latching mechanism 154, the clasp devices 180, the Bowden-type cables 184 and the storage bin 142 are shown together. However, the clasp devices 180 are not attached to the storage bin 142. Specifically, as shown in FIGS. 10 and 11, the clasp devices 180 are fixed to the latch support brackets 168. In FIG. 14, the latching mechanism 154 and the clasp devices 180 are depicted along side the storage bin 142 to show their spatial relationship only (the storage bin 142 is in the closed position in FIG. 14).

Figure 13:
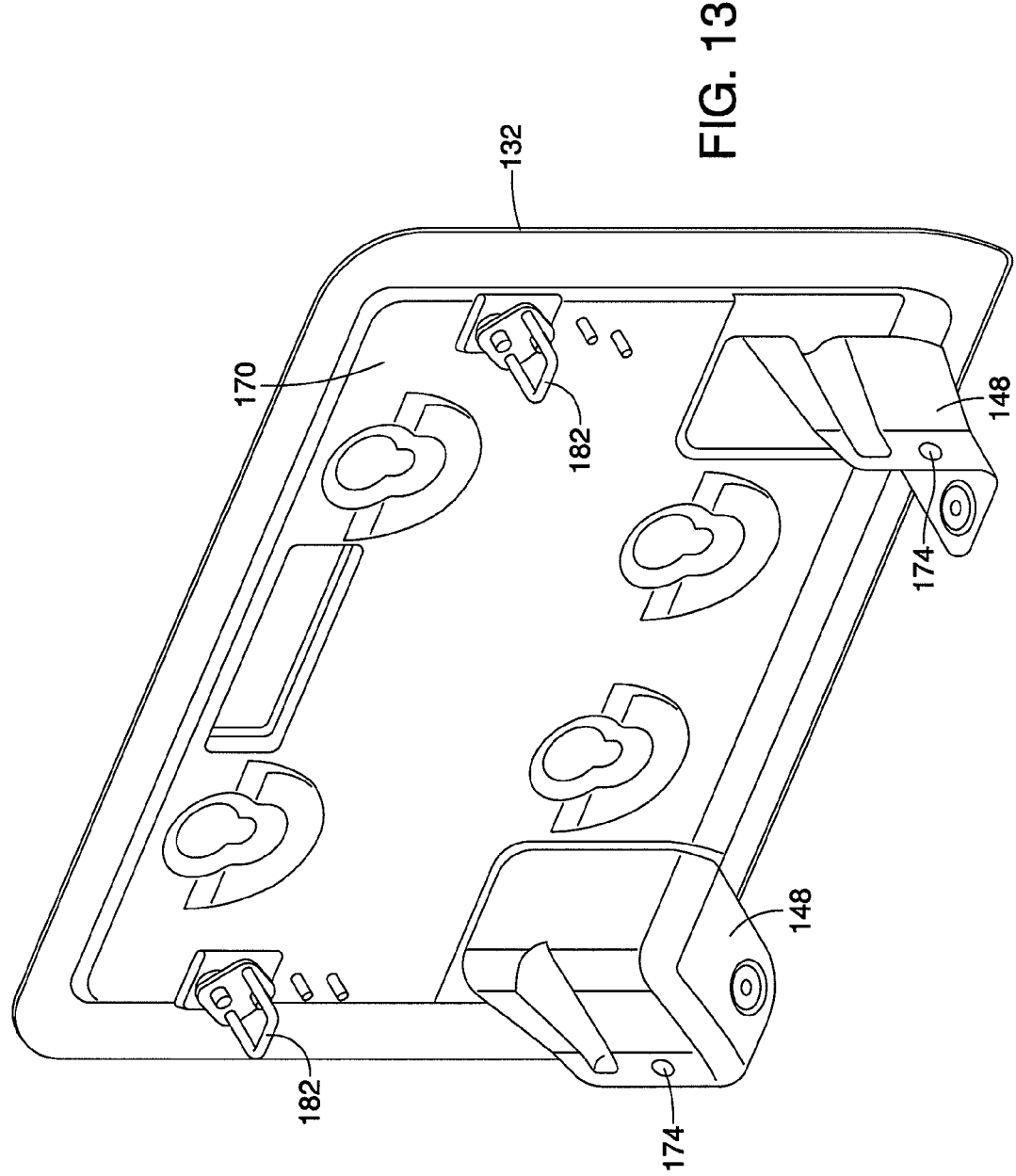
FIG. 13 is a perspective view of an outboard side of the door panel of the storage compartment assembly shown removed from the storage compartment assembly and the storage bin, showing support brackets that support the storage bin and bar members that form part of the latch mechanism in accordance with the second embodiment of the present invention.

As shown in FIG. 13 and indicated in FIG. 9, the bar members 182 are fixed, fastened or welded to the inner support panel 170 of the door panel 132. As best shown in FIG. 14, the Bowden-type cables 184 extend between the latch mechanism 154 and the clasp devices 180. When the latch mechanism 154 is operated, movement of the latch mechanism 154 is transmitted via the Bowden-type cables 184 to the clasp devices 180.

The latch mechanism 154 is configured to move between a latched orientation and an unlatched orientation. With the latch mechanism 154 in the latched orientation, the clasp devices 180 engage the bar members 182 fixed to the inner support panel 170 of the door panel 132. Since the storage bin 142 is fixed to the door panel 132, the latch mechanism 154 and the clasp devices 180 retain the door panel 132 and the storage bin 142 in the closed position. With the latch mechanism 154 in the unlatched orientation, the storage bin 142 and the door panel 132 are free to move to the opened position as shown in FIG. 7.

In the closed position, the seal S disposed on the framing member 122 or the door panel 132 protects the articles stored in the storage bin 142 by preventing entry of debris and moisture.

As with the first embodiment, the pivot pins 150 define a pivot axis that is positioned such that the storage bin 142 is biased by gravity to move toward the opened position with the latch mechanism 154 in an unlatched orientation.

It should be understood from the drawings and the description herein that the latch mechanism 154 can also include an electric actuation device (not shown) that allows the vehicle driver to remotely lock, unlock and unlatch the latch mechanism thereby opening the storage compartment assembly 120. Such an electric actuation device can be installed within the passenger compartment of the vehicle 10. Additionally or alternatively, a remote control device such as an electric key fob can be included for exterior hands free locking, unlocking and opening operation of the latch mechanism 154.

In an alternative embodiment, the extension portion 166 can be eliminated or dimensioned such that it is even with the attachment flange 162. In other words, the storage compartment assembly 120 can be configured such that it does not protrude beyond the surface of the inboard wall panel 24. In other words, the extension portion 166 of the framing member 122 can be omitted. In such an alternative embodiment, with the door panel 132 in the closed position, the door panel 132 lies approximately flush or even with the inboard surface of the inboard wall panel 24. In other words, the framing member 122 can be dimensioned and shaped to lie flush against the inboard wall panel 24 such that the storage compartment assembly 120 has the overall appearance of the storage compartment 20 of the first embodiment.

Third Embodiment

Referring now to FIGS. 15-18, a storage compartment 220 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

It should be apparent from the drawings and the description herein that the vehicle 10 is basically unchanged in the third embodiment. The cargo area 12, the sidewall structures 16 (only one is shown) and the cargo area floor panel 18 are basically the same as in the first embodiment. As with the first embodiment described above, the side wall structure 16 includes the inboard wall panel 24, the outboard wall panel 26 (not shown), the end panel 28 and the rail panel portion 30. Further, the inboard wall panel 24 and the cargo area floor panel 18 also include the wheel well 36. The inboard wall panel 24 of the side wall structure 16 also includes the access opening 38 (shown in FIG. 16).

As with the first embodiment, in the third embodiment the storage space 34 (FIG. 16) is defined within the area confined by the inboard wall panel 24, the outboard wall panel 26, the end panel 28 and the rail panel portion 30 rearward from the wheel well 36. However, in the third embodiment, the storage compartment 220 includes a storage bin 242 and a door panel 232 and a sliding structure 250. The sliding structure 250 cooperates with the inboard wall panel 24 such that the storage bin 242 and the door panel 232 slide between the opened position and the closed position. More specifically, the sliding structure 250 is supported by the inboard wall panel 24. The sliding structure 250 can include ball and track type runners that allow the door panel 232 and the storage bin 242 to move linearly in and out of the storage space 34.

Fourth Embodiment

Referring now to FIGS. 19-22, a storage compartment 320 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

It should be apparent from the drawings and the description herein that many features of the vehicle 10 are basically unchanged in the fourth embodiment. The cargo area 12, the sidewall structures 16 (only one is shown) and the cargo area floor panel 18 are basically the same as in the first embodiment, except that the inboard wall panel 24 does not have an access opening and the outboard wall panel 26 (shown in FIG. 20) does include an access opening 338. The end panel 28 and the rail panel portion 30 are unchanged. The storage space 34 is defined within the hollow interior of the sidewall structure 16.

In the fourth embodiment the storage space 34 (FIGS. 20-22) is defined within the area confined by the inboard wall panel 24, the outboard wall panel 26, the end panel 28 and the rail panel portion 30 rearward from the wheel well 36. However, in the fourth embodiment, the storage compartment 320 includes a door panel 332 that is shaped to conform to the contours of the outboard wall panel 26 and a storage bin 342 that is fixed in place within the storage space 34. The door panel 332 is hinged such that the door panel 332 moves to an opened position allowing access to the storage space 34 via the access opening 338. A movement restriction member 344 limits the movement of the door panel 332. A pivoting shelf 360 can optionally be disposed within the storage bin 342.

Fifth Embodiment

Referring now to FIGS. 23-26, a storage compartment 420 in accordance with a fifth embodiment will now be explained. In view of the similarity between the first, fourth and fifth embodiments, the parts of the fifth embodiment that are identical to the parts of the first and/or fourth embodiments will be given the same reference numerals as the parts of the first embodiment. Moreover, the descriptions of the parts of the fifth embodiment that are identical to the parts of the first and/or fourth embodiments may be omitted for the sake of brevity.

In the fifth embodiment, the storage compartment 420 is generally the same as the storage compartment 320 of the fourth embodiment, with an access opening 338' in the outboard wall panel 26, a door panel 332' and the storage bin 342. However, in the fifth embodiment, the rail panel portion 30 includes an extension 438 of the access opening 338' and the door panel 332' includes an extension door 432 that is pivotally attached to the door panel 332'.

Sixth Embodiment

Figure 27:
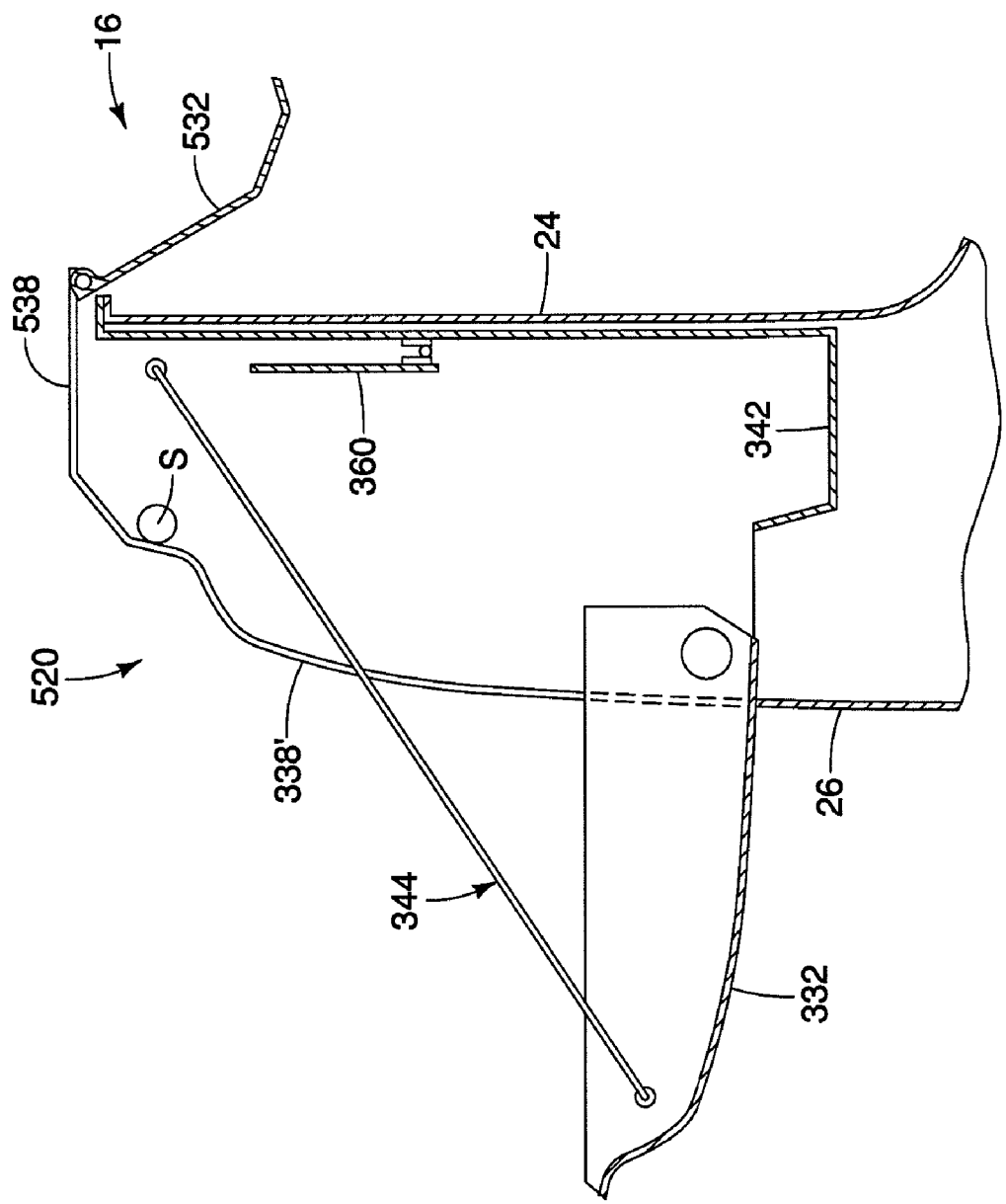
FIG. 27 is a fragmentary perspective view of the sidewall structure of the cargo area showing two door panels of a storage compartment in opened positions in accordance with a sixth embodiment of the present invention.

Referring now to FIG. 27, a storage compartment 520 in accordance with a sixth embodiment will now be explained.

In view of the similarity between the first, fourth and sixth embodiments, the parts of the sixth embodiment that are identical to the parts of the first and/or fourth embodiment will be given the same reference numerals as the parts of the first embodiment. Moreover, the descriptions of the parts of the embodiment that are identical to the parts of the first and/or fourth embodiment may be omitted for the sake of brevity.

In the sixth embodiment, the door panel 332 of the fourth embodiment is present. An access opening 338' is provided in the outboard wall panel 26 and an extension 538 of the access opening 338' is provided in the rail panel portion 30. Further, the rail panel portion 30 pivotally supports an extension door 532. In the sixth embodiment, it is possible to open the extension door 532 without opening the door panel 332.

Seventh Embodiment

Referring now to FIGS. 28-31, a storage compartment 620 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

Figure 29:
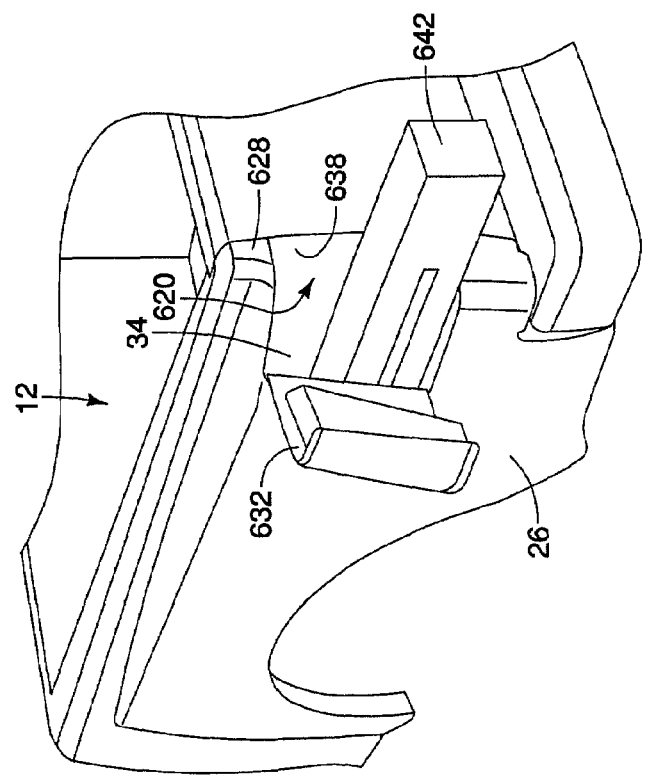
FIG. 29 is another fragmentary perspective view of the sidewall structure of the cargo area similar to FIG. 28 showing the part door panel in an opened position revealing a sliding drawer-type storage bin in accordance with the seventh embodiment of the present invention.
Figure 28:
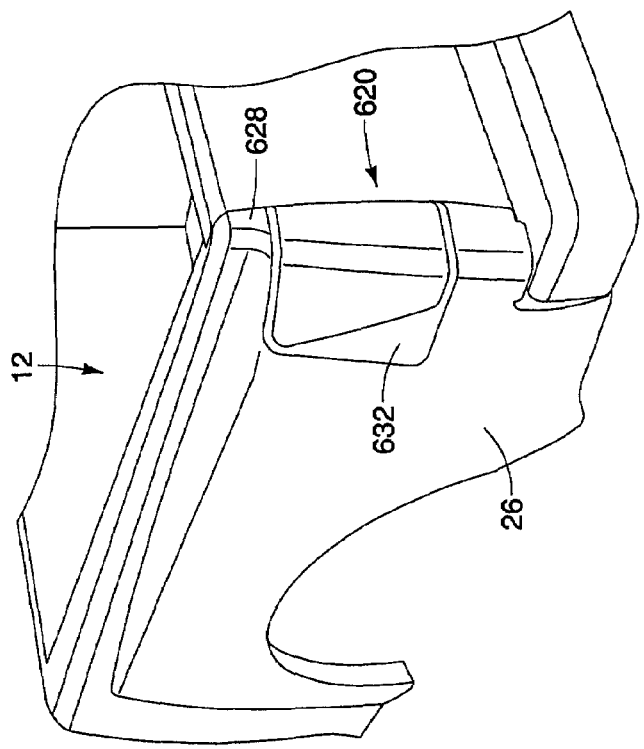
FIG. 28 is a fragmentary perspective view of the sidewall structure of the cargo area showing a part door panel of a storage compartment in a closed position concealing the storage space in accordance with a seventh embodiment of the present invention.

In the seventh embodiment, an end panel 628 replaces the end panel 28 of the first embodiment. The end panel 628 is provided with an access opening 638, as shown in FIG. 29. A door panel 632 is hinged to the outboard wall panel 26 and moves from a closed position shown in FIGS. 28 and 30 to an open position shown in FIGS. 29 and 31. The door panel 632 reveals a storage bin 642 that slides in and out of the storage space 34.

As is described above, the storage compartment 20, the storage compartment assembly 120, and storage compartments 220, 320, 420, 520 and 620 are all located in a specific region of the side wall structure 16. Specifically, in each of the described embodiments, the storage compartment 20, the storage compartment assembly 120, and storage compartments 220, 320, 420, 520 and 620 are all located between a rearmost part of the wheel well 36 (where a rearward part of the wheel well 36 and the cargo area floor panel 18 meet) and the tailgate 14. Further, since the strut 40 defines a stop for the tailgate 14, the storage compartment 20, the storage compartment assembly 120, and storage compartments 220, 320, 420, 520 and 620 are all located between the rearmost part of the wheel well 36 and the strut 40.

Vehicle structures such as pickup truck structures include many conventional components that are well known in the art. Since vehicles and pickup truck structures are well known in the art, these structures will not be discussed or illustrated in detail herein. Rather, it will be apparent to those skilled in the art from this disclosure that the components can be any type of vehicle structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle cargo sidewall structure comprising:
   a vertical inboard wall panel at least partially defining a cargo area of a vehicle, the inboard wall panel having an access opening;
   a vertical outboard wall panel extending along side the inboard wall panel to define a side wall structure with a concealed storage space located between opposed portions of the inboard and outboard wall panels, the storage space being accessible via the access opening;
   a pair of pivot pins supported within the concealed storage space, the pivot pins defining a pivot axis;
   a pair of support brackets each including an aperture that receives a corresponding one of the pivot pins;
   a door panel rigidly fixed to the pair of support brackets, the support brackets and the door panel being configured for pivotal movement about the pivot axis such that the door panel moves between a closed position overlaying the access opening to conceal the storage space and an opened position to expose the storage space, the pivot axis being located between the inboard wall panel and the outboard wall panel and is spaced apart from the inboard wall panel and the outboard wall panel; and
   a storage bin having a front wall, a back wall opposed to the front wall, a pair of opposing side walls, a bottom wall and an upper end defining a bin opening, the front wall coupled to the door panel for movement of the storage bin therewith such that with the door panel in the closed position the storage bin is disposed within the storage space and with the door panel in the opened position the storage bin at least partially extends out of the storage space, the pivot axis extending through the storage bin and the pivot pins being spaced apart from the storage bin.

2. The vehicle cargo sidewall structure as set forth in claim 1, wherein
the door panel and the storage bin are at least partially supported by the inboard wall panel.

3. The vehicle cargo sidewall structure as set forth in claim 1, wherein
the pivot axis is positioned such that the storage bin is biased by gravity to move toward the opened position.

4. The vehicle cargo sidewall structure as set forth in claim 1, wherein
the door panel comprises an outer panel and an inner support panel and the front wall of the storage bin is coupled to the inner support panel.

5. The vehicle cargo sidewall structure as set forth in claim 1, further comprising:
a framing member fixed to the inboard panel dimensioned to reinforce the portion of the inboard wall panel surrounding the access opening.

6. The vehicle cargo sidewall structure as set forth in claim 5, wherein
the framing member includes a pair of support members disposed within the concealed storage space having a pair of apertures that receive the pivot pins such that the support members support the support brackets, the storage bin and the door panel.

7. The vehicle cargo sidewall structure as set forth in claim 6, wherein
the framing member, the support members, the storage bin, the support brackets and the door panel are configured as a pre-constructed storage assembly installed to the inboard wall panel at the access opening.

8. The vehicle cargo sidewall structure as set forth in claim 7, further comprising:
a cover that extends from the framing member and is dimensioned to cover the bin opening at the upper end of the storage bin with the door panel in the closed position.

9. The vehicle cargo sidewall structure as set forth in claim 1, further comprising:
a cover that extends from proximate the inboard wall panel toward the outboard wall panel dimensioned to cover the upper end of the storage bin with the door panel in the closed position.

10. The vehicle cargo sidewall structure as set forth in claim 1, further comprising
a rear strut and a wheel well at least partially defined by the inboard wall panel; and
the storage space is confined to an area between the wheel well and the rear strut.

11. The vehicle cargo sidewall structure as set forth in claim 10, further comprising:
a latch mechanism configured to latch the door panel in the closed position and unlatch the door panel such that the door panel is free to move to the opened position; and
a release mechanism operably coupled to the latch mechanism, the release mechanism being positioned on the rear strut spaced apart from the access opening and the door panel.

12. A vehicle cargo sidewall structure comprising:
a vertical inboard wall panel at least partially defining a cargo area of a vehicle, the inboard wall panel having an access opening;
a vertical outboard wall panel extending along side the inboard wall panel to define a side wall structure with a concealed storage space located between opposed portions of the inboard and outboard wall panels, the storage space being accessible via the access opening;
a door panel arranged for movement between a closed position overlaying the access opening to conceal the storage space and an opened position to expose the storage space; and
a storage bin coupled to the door panel for movement therewith such that with the door panel in the closed position the storage bin is disposed within the storage space and with the door panel in the opened position the storage bin at least partially extends out of the storage space,
the door panel having a curved lower end that extends at least partially into the storage space with the door panel in the closed position with a small gap defined between the curved lower end of the door panel and a lower edge of the access opening of the vertical inboard wall panel that remains approximately constant with the door panel in the open position and the closed position.

13. A vehicle storage structure assembly configured for attachment to a cargo area sidewall defining a storage area and an access opening for accessing the storage area, the vehicle storage structure assembly comprising:
a support structure defining an opening dimensioned to align with the access opening with the support structure installed to the cargo area sidewall;
a storage bin having a front wall, a back wall opposed to the front wall, a pair of opposing sidewalls, a bottom wall and an upper end defining a bin opening, the storage bin being pivotally supported to the support structure for movement about a pivot axis between a closed position and an opened position where the storage bin and the support structure are configured and arranged such that in the closed position the storage bin extends through the opening and in the opened position the storage bin at least partially extends out of the opening, the pivot axis being located between the rear wall and the front wall of the storage bin, and the pivot axis being spaced apart from the front wall by a first distance and spaced apart from the back wall by a second distance that is greater than the first distance;
a door panel supported to the front wall of the storage bin for movement therewith such that with the door panel in the closed position the door panel covers the opening.

14. The vehicle storage structure assembly as set forth in claim 13, wherein
the support structure includes a framing member that defines the opening and includes a pair of support members configured to movably support the storage bin and the door panel.

15. The vehicle storage structure assembly as set forth in claim 13, wherein
the support structure includes an attachment flange contoured to fit flush against the cargo area sidewall structure.

16. The vehicle storage structure assembly as set forth in claim 13, wherein
the support structure is dimensioned and contoured to reinforce portions of the cargo area sidewall structure surrounding then access opening with the support structure installed to the cargo area sidewall structure.

17. The vehicle storage structure assembly as set forth in claim 13, wherein the support structure includes a cover that is dimensioned to cover the bin opening with the storage bin in the closed position.

18. The vehicle cargo sidewall structure as set forth in claim 1, wherein the pivot axis extends in a direction that is parallel to the front wall and the back wall of the storage bin.

19. The vehicle cargo sidewall structure as set forth in claim 1, wherein the pivot axis extends in a direction that is approximately parallel to the bottom wall of the storage bin and the pivot axis is located above and spaced apart from the bottom wall.

20. The vehicle cargo sidewall structure as set forth in claim 1, wherein the pivot axis located below and spaced apart from the upper end of the storage bin.

21. The vehicle storage structure assembly as set forth in claim 13, wherein the pivot axis is located above and spaced apart from the bottom wall of the storage bin.

22. The vehicle storage structure assembly as set forth in claim 13, wherein the pivot axis located below and spaced apart from the upper end of the storage bin.

23. The vehicle cargo sidewall structure as set forth in claim 7, wherein the framing member includes a pair of support members disposed within the concealed storage space, the support members being configured to support the storage bin and the door panel for pivotal movement about the pivot axis, the framing member being attached to the inboard wall panel.

24. The vehicle cargo sidewall structure as set forth in claim 8, wherein the cover is stationary relative to the framing member and the storage bin is pivotal between the closed position and the open position relative to the framing member.

25. The vehicle cargo sidewall structure as set forth in claim 8, wherein the cover includes a downward extending flange dimensioned to extend below and surround the upper end of the storage bin when the storage bin is in the closed position.

26. The vehicle cargo sidewall structure as set forth in claim 9, wherein the cover is stationary relative to the framing member and the storage bin is pivotal between the closed position and the open position relative to the framing member.

27. The vehicle storage structure assembly as set forth in claim 9, wherein the cover includes a downward extending flange dimensioned to extend below and surround the upper end of the storage bin when the storage bin is in the closed position.

28. The vehicle cargo sidewall structure as set forth in claim 17, wherein the cover is stationary relative to the support structure and the storage bin is pivotal between the closed position and the open position relative to the support structure.

29. The vehicle storage structure assembly as set forth in claim 17, wherein the cover includes a downward extending flange dimensioned to extend below and surround the upper end of the storage bin when the storage bin is in the closed position.

* * * * *